US012767009B2

(12) United States Patent
Kim

(10) Patent No.: US 12,767,009 B2
(45) Date of Patent: Oct. 20, 2026

(54) METHOD AND DEVICE FOR BATTERY CONTROL USING ARTIFICIAL INTELLIGENCE FOR PREDICTING AVERAGE POWER-TRAIN POWER

(71) Applicants: Hyundai Motor Company, Seoul (KR); Kia Corporation, Seoul (KR)

(72) Inventor: Young Kwang Kim, Ansan-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 282 days.

(21) Appl. No.: 18/508,439

(22) Filed: Nov. 14, 2023

(65) Prior Publication Data

US 2024/0262254 A1 Aug. 8, 2024

(30) Foreign Application Priority Data

Feb. 7, 2023 (KR) ........................ 10-2023-0016355

(51) Int. Cl.

*B60L 58/40* (2019.01)
*B60R 16/03* (2006.01)
*G07C 5/00* (2006.01)
*G07C 5/08* (2006.01)

(52) U.S. Cl.

CPC .............. *B60L 58/40* (2019.02); *B60R 16/03* (2013.01); *G07C 5/008* (2013.01); *G07C 5/0808* (2013.01); *B60L 2200/18* (2013.01)

(58) Field of Classification Search

CPC ...... B60L 58/40; B60L 2200/18; B60L 58/12; B60L 58/13; B60L 58/16; B60L 58/18; B60L 7/10; B60L 15/2009; B60L 53/60; B60R 16/03; G07C 5/008; G07C 5/0808; H02J 7/342; Y02T 10/70; Y02T 10/7072

See application file for complete search history.

(56) References Cited

U.S. PATENT DOCUMENTS 11,007,893 B2 * 5/2021 Nozaki .................. B60L 50/62
2015/0134174 A1 * 5/2015 Preece .................. H01M 10/44 701/22
2020/0050954 A1 * 2/2020 Fukushima ............ G06N 5/046

FOREIGN PATENT DOCUMENTS

EP 1296304 A2 * 3/2003 ............. G08G 1/164

* cited by examiner

*Primary Examiner* — Rachid Bendidi
*Assistant Examiner* — Hana Victoria Hall
(74) *Attorney, Agent, or Firm* — Slater Matsil, LLP

(57) ABSTRACT

Embodiments provide a method for battery control using an artificial intelligence for predicting an average power-train power. A predicted power demand is obtained based on an average predicted power-train power and an accessories power. The average predicted power-train power is generated by a drive prediction model based on driving data of a moving object with a second battery receiving power from a first battery. It is determined whether or not discharge control or charge control is required. When the discharge control is the required state, a discharge mode is determined based on the predicted power demand, an actual power of the discharge control, the accessories power, and limit information. When the charge control is the required state, a charge mode is determined based on the predicted power demand, an actual power of the charge control, and the limit information.

20 Claims, 12 Drawing Sheets

(a) (b)

(a) (b)

| SOC (%) | 0 | 20 | 40 | 50 | 55 | 60 | 65 | 70 | 80 | 90 | 100 |
|---|---|---|---|---|---|---|---|---|---|---|---|
| CORRECTION POWER(kW) | 100 | 60 | 15 | 15 | 15 | 15 | 5 | −10 | −20 | −30 | −30 |

METHOD AND DEVICE FOR BATTERY CONTROL USING ARTIFICIAL INTELLIGENCE FOR PREDICTING AVERAGE POWER-TRAIN POWER

CROSS-REFERENCE TO RELATED APPLICATIONS

The present application claims priority to Korean Patent Application No. 10-2023-0016355, filed on Feb. 7, 2023, the entire contents of which are incorporated herein for all purposes by this reference.

TECHNICAL FIELD

The present disclosure relates to a method and device for battery control using an artificial intelligence for predicting average power-train power.

BACKGROUND

Vehicles loaded with heavy freight and having frequent long-distance travels have used conventional fossil fuels as their energy source. However, in recent years, as environment-friendly energy sources are demanded, vehicles tend to be designed to operate not by fossil fuels but by electric energy. Vehicles may be driven only by electric batteries mounted in them and may also be driven as a fuel cell electric vehicle using a fuel cell together with an electric battery as the main energy source in order to satisfy performance requirements mainly associated with usage, weight, and driving distance.

Vehicles based on fuel cells are mainly used as a commercial vehicle like a bus, a large truck, and a container truck, but their applications are expanding to various usages including, for example, small cars and special-purpose vehicles.

Power needed for travel drive of a fuel cell-based vehicle is normally provided by an electric battery, and for the purpose of power supply, the electric battery may be charged by the electric generation of the fuel cell. Travel drive is implemented by power-train power, and the power-train power is ultimately based on the generated output of a fuel cell. In addition, apart from the travel drive of a vehicle, because the vehicle requires an accessories power for using accessories mounted in the vehicle, energy is also needed to support the accessories power. That is, the travel drive and the operation of accessories occur by actually using a vehicle, and the power-train power of travel drive and the accessories power may be consumed according to a request of a vehicle user.

A power-train power and an accessories power thus determined may constitute a power required for actual operation of a vehicle. Conventionally, a power generation amount map is used that tabulates a power generation amount of a high voltage battery according to a required power of a vehicle and state of charge (SOC) of the fuel cell, and a power amount defined in the map is determined as the power generation amount of the fuel cell.

To sum up, vehicles with a same purpose use a same power generation amount map. Accordingly, because a conventional power generation amount map is not prepared by reflecting past driving environments and operating conditions that are different according to vehicles, a power generation amount thus calculated may not correspond to a driving situation that is uniquely required for each vehicle. Furthermore, when a vehicle is driven repeatedly in a different route from that of another vehicle, if a power generation amount is set by a power generation amount map that is commonly applied to every vehicle, the power generation amount may not fit for the unique route of the vehicle. This is because the power generation amount map cannot adaptively provide a power generation amount to a repetitive driving situation or a similar driving situation. Specifically, when a vehicle is operated in a driving situation that is similar to a past one, a conventional method of determining a power generation amount cannot provide an optimal power generation amount for such a unique driving situation of the vehicle because it does not predict any driving situation after the current situation.

As the conventional method considers neither a unique driving situation of a vehicle nor its prediction, the conventional method may set a power generation amount to an excessive value out of concern that an unexpected high power requirement and battery overdischarge make driving impossible. Such an excessive amount of power generation, which is unnecessary for a driving situation, may significantly lower the generation efficiency of fuel cells.

SUMMARY

The present disclosure relates to a method and device for battery control using an artificial intelligence for predicting average power-train power and, more particularly, to a battery control method and device for efficiently controlling a battery of a moving object by estimating a power-train power based on inherent information of the moving object, as well as predicting the power-train power adaptively in a driving situation of the moving object.

The present disclosure is technically directed to provide a method and device for battery control using an artificial intelligence for predicting average power-train power so that a battery of a moving object can be efficiently controlled by estimating a power-train power based on inherent information of the moving object, as well as predicting the power-train power adaptively in a driving situation of the moving object.

The technical advantages of embodiments of the present disclosure are not necessarily limited to the above-mentioned technical issues, and other technical issues that are not mentioned can be clearly understood by those skilled in the art through the following descriptions.

According to an embodiment of the present disclosure, there is provided a method for battery control using an artificial intelligence for predicting an average power-train power, and the method can include obtaining a predicted power demand based on an average predicted power-train power and an accessories power. The average predicted power-train power can be generated by a drive prediction model based on driving data of a moving object. The moving object can have a second battery receiving power from a first battery. Also, the method can include determining whether or not discharge control or charge control is required in real time in a driving power system of the moving object. In case of the discharge control, the method can include determining a discharge mode based on the predicted power demand, an actual power of the discharge control, the accessories power and limit information associated with charge/discharge of the second battery and the driving power system respectively, and based on the determined discharge mode, a power generation amount of the first battery. In case of the charge control, the method can include determining a charge mode based on the predicted power demand, an actual power of the charge control and the limit information, and determining, based on the determined charge mode, a power generation amount of the first battery.

According to an embodiment of the present disclosure in the method, the average predicted power-train power can be an average power-train power that is predicted in the driving power system, and the accessories power is a power that is consumed in a non-driving power system of the moving object during driving. The driving data can include average data for weight data according to a use state of the moving object, acceleration/deceleration control data associated with acceleration and braking control requested to the moving object, regeneration control data associated with regenerative braking control of the moving object, speed data of the moving object, gradient data associated with a gradient on a driving route of the moving object, stop data associated with stop control of the moving object, drive data associated with a power-train power required in the driving power system, or any combination thereof. Also, at least a part of the driving data can be generated by being processed as a scaled mean arc length for data belonging to the driving data.

According to an embodiment of the present disclosure in the method, the determining of whether or not the discharge control or the charge control can be required, can include determining that the discharge control is required, when an instantaneous power demand required in real time in the driving power system is equal to or greater than zero (o), and determining that the charge control is required, when the instantaneous power demand is smaller than zero.

According to an embodiment of the present disclosure in the method, the limit information can include a second battery discharge limit and a power system discharge limit of the driving power system. In case of the discharge control, an actual power of the discharge control can be an instantaneous power limit that is determined based on the instantaneous power demand and the power system discharge limit. Also, the discharge mode can be determined as a first discharge mode, when a first sum of the instantaneous power limit and the accessories power is equal to or smaller than a second sum of the predicted power demand and the second battery discharge limit. The discharge mode can be determined as a second discharge mode that is executed as stronger discharge than the first discharge mode, when the first sum is greater than the second sum.

According to an embodiment of the present disclosure in the method, the determining of the power generation amount of the first battery based on the determined discharge mode can include determining the power generation amount of the first battery based on the predicted power demand in case of the first discharge mode, and determining the power generation amount based on the instantaneous power limit, the accessories power and the second battery discharge limit in case of the second discharge mode.

According to an embodiment of the present disclosure in the method, the limit information can include a second battery charge limit and a power system charge limit of the driving power system, and in case of the charge control, the actual power of the charge control can be an instantaneous power limit that is determined based on the instantaneous power demand and the power system charge limit. The charge mode can be determined as a first charge mode, when an absolute value of a first moving object charge limit is larger than the instantaneous power limit. Also, the charge mode can be determined as a second charge mode that is implemented with stronger charge than the first charge mode, when the first moving object charge limit is equal to or smaller than the instantaneous power limit by absolute value. In addition, the first moving object charge limit can be an estimated limit, to which the moving object is charged in the first charge mode, and can be determined based on the predicted power demand and the second battery charge limit.

According to an embodiment of the present disclosure in the method, the determining of the power generation amount of the first battery based on the determined charge mode can include determining the power generation amount of the first battery based on the predicted power demand in case of the first charge mode, and determining the power generation amount of the first battery based on the instantaneous power limit, the accessories power, and the second battery charge limit in case of the second charge mode.

According to an embodiment of the present disclosure in the method, the determining of the power generation amount of the first battery based on the determined discharge mode can include determining the power generation amount of the first battery based on a moving object power generation amount according to the determined discharge mode, a state of the first battery and a power generation limit of the first battery. Also, the determining of the power generation amount of the first battery based on the determined charge mode can include determining the power generation amount of the first battery based on a moving object power generation amount according to the determined charge mode, a state of the first battery and a power generation limit of the first battery.

According to an embodiment of the present disclosure in the method, the obtaining of the predicted power demand can include obtaining the predicted power demand based on a state of charge (SOC) corrected power, which is corrected based on a current SOC of the second battery, together with the average predicted power-train power and the accessories power.

According to an embodiment of the present disclosure in the method, the drive prediction model can be generated from a server outside the moving object or is updated in the server and then is received from the server. Also, the drive prediction model can be built by learning of an artificial intelligence model that uses existing driving data that is generated from past driving of the moving object, and the learning can be performed based on a moving average value of existing driving data, which is calculated by moving a window with a predetermined size in the existing driving data that is generated in time series.

According to another embodiment of the present disclosure, there is provided a device for battery control using an artificial intelligence for predicting an average power-train power. The device can include a memory configured to store at least one instruction, and a processor configured to execute the at least one instruction stored in the memory. The processor can be configured to obtain a predicted power demand based on an average predicted power-train power, which is generated by a drive prediction model based on driving data of a moving object with a second battery receiving power from a first battery and an accessories power, determine whether or not discharge control or charge control is required in real time in a driving power system of the moving object, in case of the discharge control, determine a discharge mode based on the predicted power demand, an actual power of the discharge control, the accessories power and limit information associated with charge/discharge of the second battery and the driving power system respectively, and determine, based on the determined discharge mode, a power generation amount of the first battery, and in case of the charge control, determine a charge mode based on the predicted power demand, an actual power of the charge control and the limit information and determine, based on the determined charge mode, a power generation amount of the first battery.

The features briefly summarized above for this disclosure are only exemplary embodiments of the detailed description of the disclosure which follow, and are not intended to necessarily limit the scope of the disclosure.

The technical problems solved by an embodiment of the present disclosure are not necessarily limited to the above technical problems and other technical problems which are not described herein can be clearly understood by a person (hereinafter referred to as an ordinary technician) having ordinary skill in the technical field, to which the present disclosure belongs, from the following description.

According to embodiments of the present disclosure, it can be possible to provide a method and device for battery control using an artificial intelligence for predicting average power-train power so that a battery of a moving object can be efficiently controlled by estimating a power-train power based on inherent information of the moving object, as well as predicting the power-train power adaptively in a driving situation of the moving object.

Effects obtained via embodiments of the present disclosure are not necessarily limited to the above-mentioned effects, and other effects not mentioned above can be clearly understood by those skilled in the art from the following description.

DETAILED DESCRIPTION OF ILLUSTRATIVE EMBODIMENTS

Figure 1:
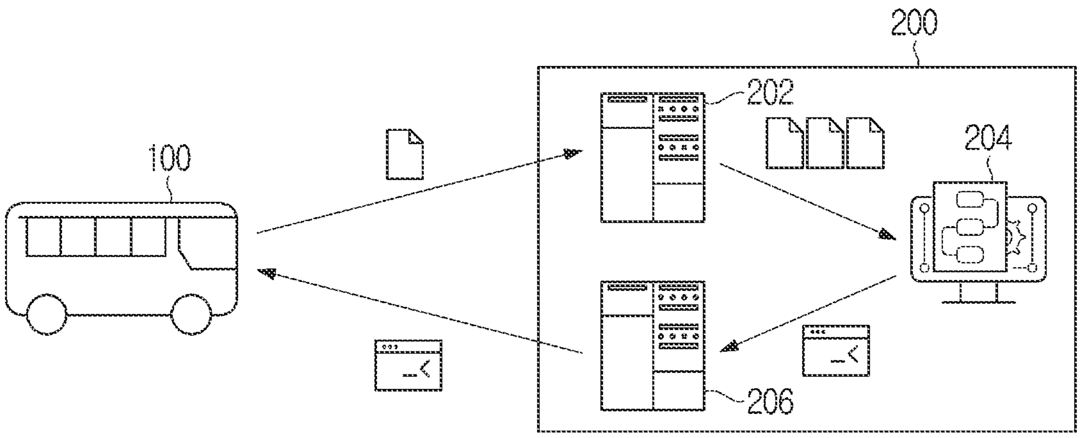
FIG. 1 is a view exemplifying in an embodiment a moving object that transmits and receives driving data and a drive prediction model by communicating with another device.

Hereinafter, exemplary embodiments of the present disclosure will be described in detail with reference to the accompanying drawings so that those skilled in the art can easily implement embodiments of the present disclosure. However, embodiments of the present disclosure can be implemented in various different ways, and are not necessarily limited to the embodiments described herein.

In describing exemplary embodiments of the present disclosure, well-known functions or constructions may not be described in detail because they can unnecessarily obscure the understanding of the present disclosure. The same constituent elements in the drawings can be denoted by the same reference numerals, and a repeated description of the same elements may be omitted.

In the present disclosure, when an element is simply referred to as being "connected to," "coupled to," or "linked to" another element, this can mean that an element is "directly connected to," "directly coupled to," or "directly linked to" another element or is connected to, coupled to, or linked to another element with the other element intervening therebetween. In addition, when an element "includes" or "has" another element, this means that one element can further include another element without excluding another component unless specifically stated otherwise.

In the present disclosure, the terms first, second, etc. can be used to distinguish one element from another and do not necessarily limit the order or the degree of importance between the elements unless specifically mentioned. Accordingly, a first element in an embodiment could be termed a second element in another embodiment, and, similarly, a second element in an embodiment could be termed a first element in another embodiment, without departing from the scope of the present disclosure.

In the present disclosure, elements that are distinguished from each other are for clearly describing each feature, and do not necessarily mean that the elements are separated. That is, a plurality of elements can be integrated in one hardware or software unit, or one element can be distributed and formed in a plurality of hardware or software units. Therefore, even if not mentioned otherwise, such integrated or distributed embodiments are included in the scope of the present disclosure.

In the present disclosure, elements described in various embodiments do not necessarily mean essential elements, and some of them can be optional elements. Therefore, an embodiment composed of a subset of elements described in an embodiment also can be included in the scope of the present disclosure. In addition, embodiments including other elements in addition to the elements described in the various embodiments also can be included in the scope of the present disclosure.

The advantages and features of embodiments and the way of attaining them will become apparent with reference to embodiments described below in detail in conjunction with the accompanying drawings. Embodiments, however, can be embodied in many different forms and should not be constructed as being limited to example embodiments set forth herein. Rather, these embodiments are provided so that this disclosure will be complete and will fully convey the scope of embodiments of the present disclosure to those skilled in the art.

In the present disclosure, each of phrases such as "A or B", "at least one of A and B", "at least one of A or B", "A, B or C", "at least one of A, B and C", "at least one of A, B or C", and "at least one of A, B, C or combination thereof" can include any one or all possible combinations of the items listed together in the corresponding one of the phrases.

In the present disclosure, expressions of location relations used in the present specification such as "upper", "lower", "left" and "right" can be employed for the convenience of explanation, and in case drawings illustrated in the present specification are inversed, the location relations described in the specification can be inversely understood.

Hereinafter, embodiments of the present disclosure will be described with reference to the accompanying drawings.

Referring to FIG. 1, a battery control device will be described that uses an artificial intelligence to predict average power-train power according to an embodiment of the present disclosure.

FIG. 1 is a view exemplifying a moving object that transmits and receives driving data and a drive prediction model by communicating with another device.

Referring to FIG. 1, a moving object 100 can be driven based on electrical energy. For example, the moving object 100 can employ a gas-based fuel cell as an energy source. As for a fuel cell, the moving object 100 can use various types of gas capable of generating electric energy in the fuel cell, and the gas can be hydrogen, for example. However, the gas is not necessarily limited thereto, and various types of gas can be applied. In the present disclosure, the fuel cell-based vehicle 100 will be described as an example moving object based on electrical energy. However, the present disclosure is applicable to any vehicle that has heterogeneous types of first and second batteries and employs a method of charging the second battery, which outputs power for driving of the vehicle and for accessories, by generating the first battery.

The moving object 100 can refer to a device capable of moving. As a vehicle running on the ground, the moving object 100 can be a normal passenger or commercial moving object, a mobile office, or a mobile hotel. The moving object 100 can be a four-wheel moving object such as a sedan, a sports utility vehicle (SUV), and a pickup truck, and can also be a moving object with five or more wheels such as a bus, a lorry, a container moving object, and a heavy moving object. The moving object 100 can be a manned or unmanned robot using a plurality of batteries such as a robotic device for a construction machine.

In addition, the moving object 100 is not necessarily limited to a ground moving object but can be an aerial moving object using a plurality of batteries or a water moving object for water transportation. An aerial moving object can include a manned or unmanned aerial object, and an unmanned aerial object can be a drone or a personal aerial vehicle (PAV). A water moving object can be a manned or unmanned ship or submarine.

The moving object 100 can be implemented by manual driving or autonomous driving (either semi-autonomous or full-autonomous driving).

The moving object 100 can communicate with another device or another moving object. For example, another device can include a server 200 capable of supporting the driving of the moving object 100, an ITS device for receiving information from an intelligent transportation system (ITS), and various types of user devices.

The server 200 can send various information and a software module, which are used to control the moving object 100, to the moving object 100 in response to a request and data transmitted from the moving object 100. For example, a software module can be a moving object control software model for controlling the driving, route, power, and non-driving function modules of the moving object 100. In addition, a moving object control software model can include a drive prediction model that is used for battery control for satisfying power required in the moving object 100, and the drive prediction model can be trained based on inherent information of the moving object 100 that is transmitted from the moving object 100. For example, inherent information can include a basic configuration of the moving object 100 and driving data with information that is generated or obtained during its running. In addition, in case the moving object 100 is operated in autonomous driving mode, a moving object control software model can include data and a software module that are associated with the recognition, determination, and control of autonomous driving.

The moving object 100 can communicate with another moving object or another device based on cellular communication, WAVE communication, DSRC (Dedicated Short Range Communication) and other communication systems. For example, as a cellular communication network, a communication network such as LTE, 5G, WiFi communication network, WAVE communication network, etc. can be used. In addition, a local area network used in the moving object 100, such as DSRC can be used, and the present disclosure is not necessarily limited to the above-described embodiment.

For example, under the control of a communication control unit (CTU) mounted on the moving object 100, the moving object 100 can transmit data, which is generated or stored during driving, and an application (or software) to the server 200. In addition, by using the CTU, the moving object 100 can receive data and a software module that are transmitted from the server 200. Through the CTU, the moving object 100 can receive a moving object control software model including a drive prediction model that is newly built up or updated in the server 200.

The server 200 can receive, from the moving object 100, information for various types of control of the moving object 100 and manage the information, while communicating with the moving object 100. The server 200 can generate or update a software module to be used for controlling the moving object 100 through learning and deploy the software module to the moving object 100. Specifically, the server 200 can include a data server module 202 for receiving and managing the information, a learning module 204 for generating or updating a software module through learning based on the information, and an update server module 206 for deploying a software module of the moving object 100 to the moving object in order to deliver or update the software module. Hereinafter, when a function of the server 200 is described, each module may not be separately described, but for convenience of explanation, the server 200 may be described to perform the function of a corresponding module. If the description of a detailed function of the server 200 corresponds to the above-described module, it may be construed that the function of the module has been described.

In addition, a software module can include various types of software for control of a moving object, and in embodiments described herein, the description will focus on software that is used to determine a power generation amount of a battery. The software can be a drive prediction model that predicts an average power-train power to determine a power generation amount of a battery.

In addition, hereinafter, for convenience of description, the embodiments according to the present disclosure will be described with the moving object 100 being exemplified as a vehicle operating on the ground. However, embodiments of the present disclosure can be applied to the various types of moving objects described above, that is, an aerial moving object and a water moving object.

Figure 2:
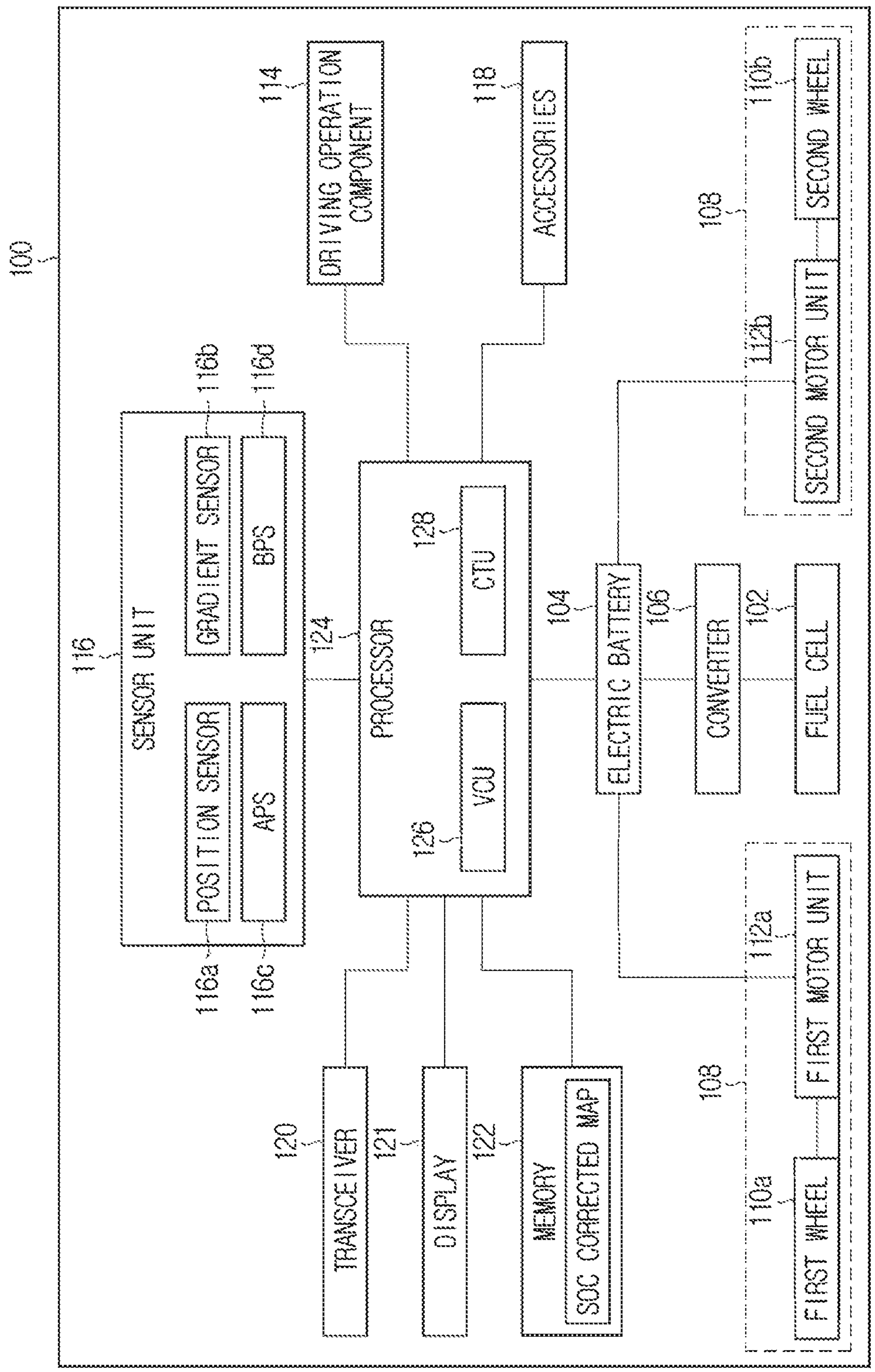
FIG. 2 is a block diagram showing constituent modules of a moving object with a battery control device according to an embodiment of the present disclosure.

FIG. 2 is a block diagram showing constituent modules of a moving object with a battery control device according to an embodiment of the present disclosure.

The moving object 100 can include the first battery 102, the second battery 104, a driving power system 108, and a driving operation component 114.

In FIG. 2, the first battery is exemplified as the fuel cell 102, and the fuel cell 102 can be a type of first battery according to embodiments of the present disclosure. Hereinafter, the first battery and the fuel cell may be interchangeably stated. The fuel cell 102 can include a hydrogen fuel cell that generates electrical energy through reaction between hydrogen supplied from a tank (not shown) and oxygen from outside air. As exemplified in FIG. 3, the fuel cell 102 can be configured as a hydrogen fuel cell with a plurality of stacks. In addition, the fuel cell 102 can generate power corresponding to a power generation amount, which is determined based on electric power required for driving startup and accessories 118, and charge the second battery 104 with the generated electric power. In addition, according to a design specification, the fuel cell 102 can provide energy to a low-power electrical module mounted on the moving object 100.

Apart from being charged by generation of the first battery 102, the second battery 104 can supply necessary power to a module of the moving object 100. In FIG. 2, the second battery 104 is exemplified as an electric battery configured as a secondary cell, and the electric battery 104 can be a type of the second battery. Hereinafter, the second battery and the electric battery may be interchangeably stated. For example, the electric battery 104 can provide energy for driving of the moving object 100 and operation of the accessories 118. Specifically, the electric battery 104 can provide energy, which is applied from the fuel cell 102, to the startup, driving, lighting, air-conditioning, and many other electrical devices of the moving object 100. In an embodiment, the electric battery 104 can output a higher voltage than the fuel cell 102 and provide energy to, byway of example, a driving wheel and a high-power electrical module.

The converter 106 can be a module functioning as a buck-booster and charge the electric battery 104 by converting a voltage from the fuel cell 102 and providing it to the electric battery 104. Depending on an operating condition, the converter 106 can supply power at a converted voltage to first and second motor units 112*a* and 112*b*, which operate in a high-voltage range, and various electronic devices. For example, the electronic devices can be the accessories 118.

The driving power system 108 can be provided with a module capable of implementing a driving operation according to a user's request associated with driving control. According to a use space of the moving object, for example, the ground, the air, or the water, a module can be prepared to be provided to the driving power system 108. The present disclosure describes a ground moving object as an example, and in the case of a ground moving object, the driving power system 108 can include the first and second wheels 110*a* and 110*b*, and the first and second motor units 112*a* and 112*b*. In addition, the driving power system 108 can be provided with a mechanical component for transferring a power-train power of the motor units 112*a* and 112*b* to the wheels 110*a* and 110*b*, and a brake module for decelerating the wheels 110*a* and 110*b* at a request related to brake control.

In the present disclosure, the first and second wheels 110*a* and 110*b* are illustrated to function based on four wheel drive and to be driven by receiving power from the first and second motor units 112*a* and 112*b*. However, for a particular purpose, the moving object 100 can have more than four wheels. In this case, all the wheels can be driven by being connected with, by way of example, a motor unit. As another example, only some of the wheels may be connected with the motor unit, and wheels not connected with the motor unit can be driven by the wheels that are driven by a motor unit, for example. The first and second wheels 110*a* and 110*b* can have a brake module configured to put a brake on the operation of wheels at a user's deceleration control request.

The first and second motor units 112*a* and 112*b* can generate a driving force by receiving power from the second battery 104. When the first and second motor units 112*a* and 112*b* transfer a driving force to the first and second wheels 110*a* and 110*b*, the first and second wheels 110*a* and 110*b* can be driven to rotate. For example, the first and second motor units 112*a* and 112*b* can have a motor control module capable of controlling a motor, which transfers a driving force to the first and second wheels 110*a* and 110*b*, a constant/reverse motor torque, a direction of motor rotation, and braking. The first and second motor units 112*a* and 112*b* can be driven by receiving power, by way of an inverter (not shown), which is applied by the second battery 104. An inverter can convert a specific form of power of the second battery 104, for example, an alternating current to another form, that is, a direct current and reduce a voltage.

A driving operation component 114 can be configured as hardware and/or software in order to receive a user's request in the driving power system 108. For example, to receive a driving control request for acceleration, the driving operation component can be a foot accelerating pedal and a key for acceleration, which is provided as hardware and/or software. In addition, to receive a driving control request for deceleration, the driving operation component 114 can be a foot or hand brake, and/or a soft key for deceleration, and the like.

For example, in order to receive a driving control request for constant-speed driving, the driving operation component 114 can be a button or lever for cruise control or smart cruise control. As another example, in order to receive a request about constant-speed driving, the driving operation component 114 can be embodied as a soft key.

The driving operation component 114 can include a module for adjusting a braking force according to regenerative braking, and the module can be called an assistant braking module or a retarder module. For example, the assistant braking module can be provided in a form of lever near a steering wheel and/or be provided as a soft control key on the display 121 capable of receiving a user input.

The moving object 100 can include a sensor unit 116, accessories 118, a transceiver unit 120, a display 121, a memory 122, and a processor 124.

The sensor unit 116 can have various types of sensor modules for detecting various states and situations that occur inside the moving object 100 and in an external environment. For example, the sensor unit 116 can include a position sensor 116*a* capable of detecting a position of the moving object 100, a gradient sensor 116*b* capable of measuring a gradient of a course where the moving object 100 is running, an acceleration demand sensor 116*c*, and a braking demand sensor 116*d*. The acceleration demand sensor 116*c* can detect an acceleration demand according to a user's acceleration request through a driving operation component 114. For example, in case the driving operation component 114 has a foot acceleration pedal that receives an acceleration request, the acceleration demand sensor 116*c* can be configured as an accelerator position sensor (APS) that detects acceleration intention and an acceleration demand according to the foot acceleration pedal. The braking demand sensor 116*d* can detect a braking demand according to a user's braking request through the driving operation component 114. For example, in case the driving operation component 114 has a foot brake that receives a braking request, the braking demand sensor 116*d* can be configured as a brake position sensor (BPS) that detects braking intention and a braking demand according to the foot brake.

Although not illustrated, the sensor unit 116 can include an image sensor, which provides a visual image an interior and/or exterior of the moving object 100, a LiDar, a radar sensor, a distance sensor, an acceleration sensor, a wheel speed sensor, a gyro sensor for detecting the posture and orientation of the moving object 100, or any combination thereof. The present disclosure mainly describes sensors, which are referred to in describing an embodiment, but in an embodiment can further include a sensor for detecting various situations not listed herein.

The accessories 118 can be mounted on the moving object 100 and can be auxiliaries consuming power supplied from a battery according to a user's use. In the present disclosure, the accessories 118 can be a type of a non-driving power system other than the driving power system 108. For example, the accessories 118 can be an air-conditioning system, a lighting system, a seat system, and various devices installed in the moving object 100.

The transceiver unit 120 can support mutual communication with the server 200, a moving object around the moving object 100, a road side unit, a server providing various moving object services, or an edge device. In the present disclosure, under the control of a communication controller, the transceiver unit 120 can transmit data generated or stored during driving to the server 200 and receive data and a software module transmitted from the server 200.

The display 121 can function as a user interface. The display 121 can display, byway of the processor 124, the operation state, control state, route/traffic information, battery state, remaining gas information of the moving object 100 and contents requested by a user. The display 121 can be configured by a touch screen capable of detecting a user input so that it can receive a user's request that gives a command to the processor 124.

The memory 122 can store an application for controlling the moving object 100 and various data so that it can load the application or read and record data at a request of the processor 124. In an embodiment of the present disclosure, the memory 122 can store a drive prediction model and driving data obtained during driving. In addition, the memory 122 can obtain a predicted power demand based on an average predicted power-train power, which is calculated by a drive prediction model based on driving data, and accessories power consumed by the accessories 118, and store an application and at least one instruction for determining a power generation amount of the first battery 102 based on an actual power, which can be required in real time in the moving object 100, a predicted power demand, and a state of a predetermined/selected module of the moving object 100. A predetermined/selected module can be a second battery and a driving power system. The state of the module can be associated with limit information regarding charge and discharge of each of the second battery and the driving power system. A predicted power demand can be obtained based on a SOC correction power that is corrected based on a current SOC of the first battery 102, together with an average predicted power-train power and an accessories power. A power based on SOC correction of the second battery 104 can be determined using a SOC correction map stored in the memory 122.

The processor 124 can perform overall control of the moving object 100. The processor 124 can be configured to execute an application and an instruction stored in the memory 122. The processor 124 can have at least one processing module, and each control-related function can be implemented in a single processing module or in a corresponding processing module among a plurality of modules. According to the present disclosure, the processor 124 can obtain a predicted power demand based on an average predicted power-train power of a drive prediction model and an accessories power, by using an application, an instruction and data that are stored in the memory 122. In addition, the processor 124 can control the moving object 100 to determine a power generation amount of the first battery 102 based on an actual power of the moving object 100, a predicted power demand and a state of a predetermined/selected module of the moving object 100.

Specifically, by using a drive prediction model based on driving data, that is, inherent information of the moving object 100 that is accumulated while the moving object 100 is running, the processor 124 can calculate an average predicted power-train power, which is expected in the driving power system 108 according to a driving situation, and obtain an accessories power that is consumed in real time in a non-driving power system of the moving object while it is running. In addition, the processor 124 can determine whether or not the driving power system 108 of the moving object 100 requires discharge control or charge control in real time.

Discharge control can refer to consuming power from the perspective of the driving power system 108. For example, discharge control can mean that the first and second motor units 112*a* and 112*b* of the driving power system 108 receive and consume power from outside, for example, from the second battery 104, while generating a constant torque according to an acceleration control request among driving control requests. Charge control can refer to being charged with power from the perspective of the driving power system 108. For example, charge control can mean that the first and second motor units 112*a* and 112*b* charge an external module, for example, the second battery 104, while generating power by generating a reverse torque according to a deceleration control or regenerative brake request among driving control requests.

In the case of discharge control, the processor 124 can determine a discharge mode based on a predicted power demand, an actual power of discharge control, an accessories power, and limit information associated with charge and discharge of the second battery 104 and the driving power system 108, respectively, and determine a power generation amount of the first battery 102 based on the determined discharge mode. In the case of charge mode, the processor 124 can determine a charge mode based on a predicted power demand, an actual power of charge control and limit information and determine a power generation amount of the first battery 102 based on the determined charge mode.

A battery control device according to an embodiment of the present disclosure can be a device that includes at least the memory 122 and the processor 124, obtain a predicted power demand based on an average predicted power-train power and an accessories power, and performs processing of determining a power generation amount of the first battery 102 based on an actual power of the moving object 100, a predicted power demand, and a state of a specific module of the moving object 100.

The processing can be performed in at least a part of the processor 124, that is, at least one processing module and in at least a part of the memory 122. The processing module can include a vehicle control unit (VCU) 126, which controls the processing, and a communication control unit (CTU) 128 that controls the transceiver 120 to transmit driving data to the server 200 and receive a moving object control software model including a drive prediction model from the server 200. An individual processing module and an individual memory can constitute the processor 124 and the memory 122 according to an embodiment of the present disclosure.

The above-described processing of the processor 124 will be described in detail through FIG. 4 to FIG. 13.

Figure 4:
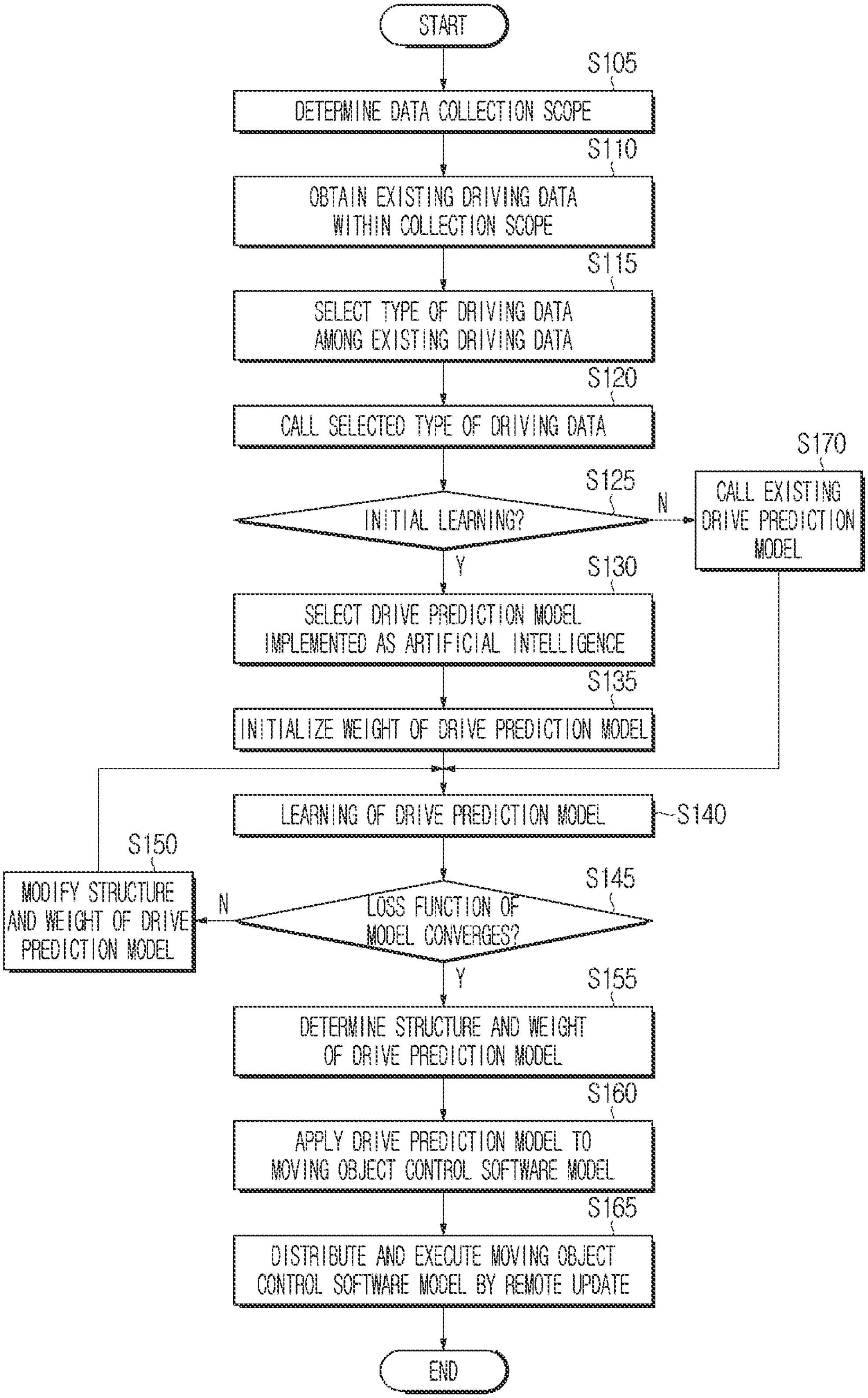
FIG. 4 is a flowchart associated with the learning and distribution of a drive prediction model in a battery control method according to another embodiment of the present disclosure.

Referring to FIG. 4, learning and deployment of a drive prediction model will be described that is used in a battery control method according to an embodiment of the present disclosure. FIG. 4 is a flowchart associated with the learning and distribution of a drive prediction model in a battery control method according to an embodiment of the present disclosure.

The server 200 can determine a collection scope for past data that will be learned to newly generate or update a drive prediction model (operation S105).

As an example, the data server module 202 of the server 200 can obtain various types of data from the moving object 100 and determine a collection scope of learning data of a drive prediction model among stored data. As another example, even in case the data server module 202 does not store data of the moving object 100, the data server module 202 can determine a collection scope of data for learning to receive data suitable for learning of a drive prediction model, when requesting the moving object 100 to transmit data. In an embodiment, irrespective of learning for a drive prediction model, as an example, data of the moving object 100 can be transmitted and stored already in the data server module 202. For example, data of the moving object 100 can be periodically transmitted from the moving object 100 to the server 200 through a vehicle customer relation management (VCRM) collection system that is operated by the server 200. As an example, such a period can be 1 second.

As an example, a collection scope can include a specification of the moving object 100, a temporal range of data, and a regional range of data. For example, the specification can include the use, type, model, age and basic weight of the moving object 100. For example, the temporal range can be set to a temporal range where the moving object is mainly running or a temporal range where much power consumption of a battery occurs so that a power generation amount of the first battery 102 is required to be equal to or greater than a predetermined/selected/stored reference value. For example, in case of a shuttle vehicle with a regular course, the regional range can be set to a region corresponding to a route of the course or a regional range where much power consumption of a battery occurs so that a power generation amount of the first battery 102 is required to be equal to or greater than a predetermined/selected/stored reference value.

Next, the data server module 202 of the server 200 can obtain existing driving data belonging to a collection scope among stored data of the moving object 100 (operation Silo).

Driving data can include data associated with a driving control request in the moving object 100 and control result data that is output to a driving power system and the first and second batteries 104 according to the driving control request. Driving data can consist of multiple types of data. Like other data of the moving object 100, driving data can be periodically transmitted to the server 200 through VCRM, for example, and be accumulated. The server 200 can obtain existing driving data in a collection scope from past data that is generated or obtained by using the moving object 100.

Next, by using the data server module 202, the server 200 can select a type of driving data utilized for learning of a drive prediction model from various types of driving data (operation S115).

Driving data can be selected as data with a type capable of not only estimating a driving situation of the moving object 100 but also of checking a power-train power according to a driving situation. In order to reduce the burden of a server resource and to lower the complexity of a model, a drive prediction model can employ a predetermined/selected/stored type of driving data that accurately calculates an average power-train power according to a driving situation of the moving object 100. In consideration of this, among multiple types of existing driving data, the data server module 202 can select a type associated with a weight according to a use state of the moving object 100, acceleration and braking control required to the moving object 100, regenerative braking control of the moving object 100, a speed, a gradient on a driving route of the moving object 100, stop control of the moving object 100, a power-train power required in a driving power system, or any combination thereof. Although the above-described types are exemplified in the present disclosure, inherent information of the moving object 100 capable of identifying a driving situation and a power-train power is not necessarily limited to the above-described types.

Next, the server 200 can call driving data corresponding to a selected type by using the data server module 202 and the learning module 204 (operation S120).

The selected type of driving data can include weight data according to a use state, acceleration/deceleration control data associated with acceleration and braking control, regeneration control data associated with regenerative braking control, speed data, gradient data associated with a gradient of a driving route, stop data associated with stop control, power-train data associated with a power-train power required in a driving power system, or any combination thereof. In the present disclosure, a detailed item of each data set is exemplified as data below, but if appropriate for each type of data, it is not necessarily limited to the item below.

Weight data can be used to distinguish power-train power according to a loaded or unloaded state of the moving object 100. For example, weight data can be measured by a weight sensor (not shown) mounted on or part of the sensor unit 116. Gradient data can be used to distinguish a power-train power according to a driving environment and can be measured by a slope sensor 116*b*, for example. For example, regenerative braking data associated with regenerative braking control can include assistant brake (or retarder) level that is set through a user's manipulation. A user can adjust an assistant brake amount through a user setting mode, which is provided according to a vehicle configuration, a retarder lever position, and a regenerative brake paddle. An assistant brake (or retarder) level can be used to distinguish a power-train power according to an assistant brake setting. For example, stop data can include data associated with manipulation control of a door switch of the moving object 100. In the case of a moving object with a regular course, stop data can be used to distinguish a stop situation of a station and a general stop situation.

For example, acceleration/deceleration control data can include a transmission flag, an anti-lock brake system (ABS) operation flag, an endurance brake integration (EBI) operation flag, or any combination thereof. A transmission flag can be used to distinguish a sudden and temporary increase in a power-train power for transmission, for example, motoring and regenerating. An ABS flag can be used to distinguish sliding due to a road surface condition and limited regenerative braking in an ABS operation due to a sudden brake request. In the case of EBI operation, an EBI operation flag can be used not only to distinguish regenerative braking even when there is no retarder level (RTD_LV=0) but also to identify a deceleration situation according to a constant-speed control request like smart cruise control. EBI can be control of reducing the use of a service brake by mixing the service brake using a foot or hand brake with regenerative braking.

In addition, for example, acceleration/deceleration control data can include a brake demand value detected by the brake demand sensor 116*d* according to a deceleration control request, an acceleration demand value detected by the acceleration demand sensor 116*c* according to an acceleration control request, a constant-speed demand according to a constant-speed control request, or any combination thereof. For example, a brake demand value is a value detected by the BPS sensor 116*d* and can be used to estimate a user's deceleration intention and a congestion degree at the time of driving. An acceleration demand value is a value detected by the APS sensor 116*c* and can be used to estimate a user's acceleration intention and the congestion degree.

The above-described type of driving data can be simply accumulated and used without preprocessing, and as another example, the above-described driving data can be provided as average data of each type corresponding to a same time period. Average data can be generated in the moving object 100 and be transmitted to the server 200 or be generated in the server 200 based on data that is periodically received from the moving object 100.

In addition, speed data can include an average speed of the moving object 100 that belongs to a same time period as other driving data. Speed data can be used to estimate a congestion degree at the time of driving.

For example, drive data can include data that is associated with torques of the first and second motor units 112*a* and 112*b* of the driving power system 108, which a user demands during driving, and a power-train power that occurs in the driving power system 108 during driving. Drive data can be generated in the moving object 100 and be transmitted to the server 200 or be generated in the server 200 based on data that is periodically received from the moving object 100.

Specifically, drive data can include an average of acceleration demands detected according to an acceleration control request, an average of constant-speed demands according to a constant-speed request, and an average user-demanded torque that is calculated at least based on limit information on a driving route. Limit information, for example, an average user-demanded torque can be used to estimate a congestion degree at the time of driving.

In case a user-demanded torque depends only on an acceleration demand value detected in the acceleration demand sensor 116*c*, the user-demanded torque may not reflect another type of acceleration control requests and an acceleration limitation required on a route, thereby not matching an actual driving situation.

Figure 5:
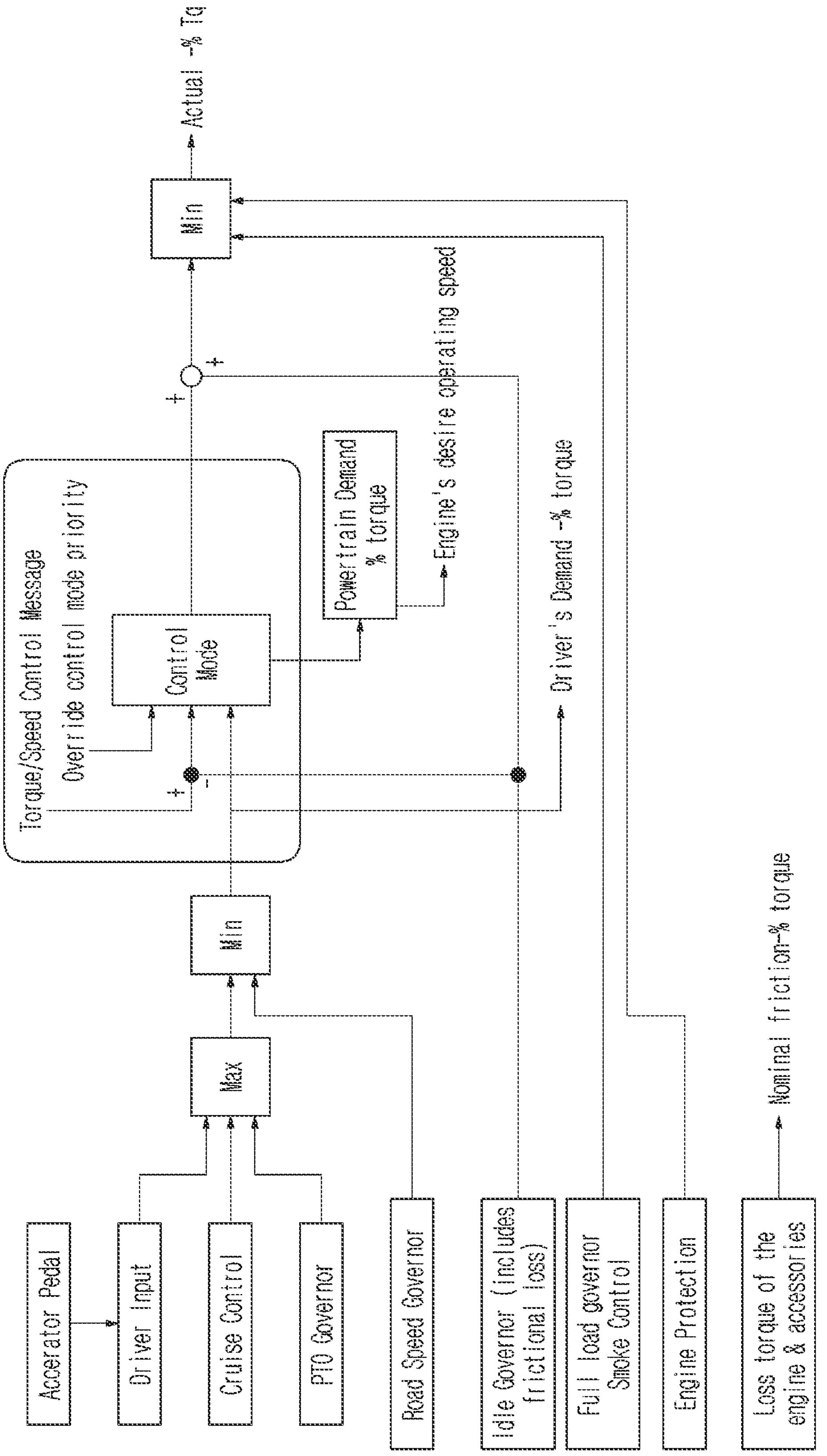
FIG. 5 is a view exemplifying a process of calculating a desired torque of a user of a moving object in driving data, of an embodiment.

FIG. 5 is a view exemplifying a process of calculating a desired torque of a user of a moving object in driving data, of an embodiment.

The processor 124 of the moving object 100 can select a maximum value among an acceleration demand value based on a user's input using an accelerator pedal, that is, an acceleration control request, a constant-speed demand value according to a constant-speed control request, and a power take off (PTO) drive power consumed in a PTO device. A PTO drive power can be identified by using a PTO governor exemplified in FIG. 5. A PTO device can be a device for using a power-train power, which is generated in the driving power system 108, for other purpose than driving the first and second wheels 110*a* and 110*b*. The processor 124 can determine a user-demanded torque based on the maximum value and the limit information. Limit information is associated with the road speed governor exemplified in FIG. 5 and can be obtained from road information that is received an image sensor of the moving object 100 and an external device. For example, limit information can be speed limit information on a driving route. The processor 124 can select a minimum value between the maximum value and the speed limit information and determine the minimum value as a user-demanded torque like the driver's demand torque exemplified in FIG. 5.

In addition, drive data can include a minimum power-train power, a maximum power-train power, and an average power-train power which occur in the driving power system 108 during driving. Through the power-train powers, a surrounding situation during driving can be estimated, and a power-train power can also be calculated which occurs due to motoring and regenerative braking.

At least a part of driving data can be generated by being processed as a scaled mean are length (hereinafter described interchangeably with mean arc length) for data belonging to the driving data and be transferred to the server 200.

For example, among driving data, an average user-demanded torque and an average power-train power can be transmitted to the server 200, and a mean arc length value of the data can also be calculated and transferred to the server 200. An average user-demanded torque and an arc length value of the average user-demanded torque can indicate an acceleration demand and its degree of change and estimate a degree of congestion during driving. In addition, an arc length value of an average power-train power can be used to infer a correlation among a surrounding situation, a maximum/minimum power-train power and an average power-train power.

An average value in the above-described data typically cannot accurately indicate a change rate of signal per minute, for example. If a variance for the above-described data is calculated, a change rate of signal can be clearly identified according to the data.

Accordingly, a reflection of statistical variance can be needed, and a scaled mean arc length method can be employed as an example. Like a conventional variance, the mean arc length can indicate a degree of change of each data set but it does not need to store all the samples in the memory of the controller, which can be inevitable to calculate the variance of each data set. Thus, using the mean arc length can be a more memory-efficient way of reflecting statistical variance compared to calculating the variance, directly. On the other hand, the mean arc length can also describe a degree of changes of signal in a specific sense, which often cannot be expressed by the variance method. A function gi of a mean arc length can be calculated by Equation 1 below. As the value of a mean arc length calculated by Equation 1 becomes larger, it can be understood that a change rate of signal per unit time is larger.

$$g_i(t_n) \cong \frac{1}{10}\sum_{k=0}^{9}\sqrt{1+\frac{1}{c_f}\left(\frac{f(t_k)-f(t_k-0.1)}{0.1}\right)^2} \quad \text{[Equation 1]}$$

Here, $t_k=t_n-k\cdot 0.1$, and $c_f$ can be a scaling constant.

Figure 6:
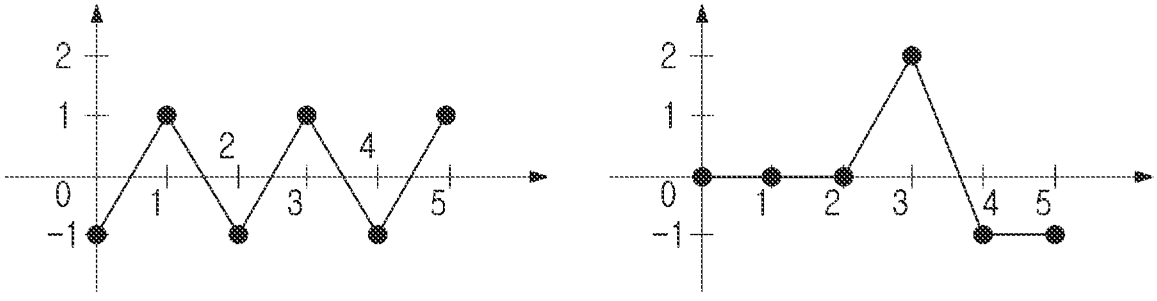
FIG. 6 is a view exemplifying a distribution of driving data that is collected in time series of an embodiment.

FIG. 6 is a view exemplifying a distribution of driving data that is collected in time series of an embodiment. Driving data exemplified in FIG. 6 may not indicate a value of specific data but can be exemplary data for clearly showing a difference between a conventional variance method and a mean arc length method.

The conventional variance values according to (a) and (b) of FIG. 6 are all 1. However, the mean arc length method can be applied to the distributions of driving data in (a) and (b) of FIG. 6, and a mean arc length value of (a) is 2.2361, and a mean arc length value of (b) is 1.6797.

As shown in the above-described values, in case a time-series analysis of driving data can have a complex change of trend, different mean arc length values can be calculated from even driving data with a same variance value. This shows that the mean arc length method produces an estimate by distinguishing a driving situation through a specific type of driving data and a user's acceleration/deceleration control request more accurately than conventional variances.

Referring to FIG. 4 again, the learning module 204 of the server 200 can determine whether or not learning of a drive prediction model of the moving object 100 is performed for the first time (operation S125).

If the learning is performed for the first time (Y of operation S125), the learning module 204 can select a drive prediction model that is embodied as an artificial intelligence (operation S130).

The learning module 204 can have a plurality of artificial intelligence models for generating an average predicted power-train power based on existing driving data and can select an artificial intelligence model with a structure suitable for the moving object 100 and driving data from the plurality of artificial intelligence models. The selected artificial intelligence model can be an initial drive prediction model. Furthermore, for a same artificial intelligence model, if different parameters are applied to the model, models with the different parameters can be considered as different models. For example, parameters can be the number of features handled in each piece of driving data, the number of stages applied to the model, a type of weight and the number of weights, and a testing method.

Figure 7:
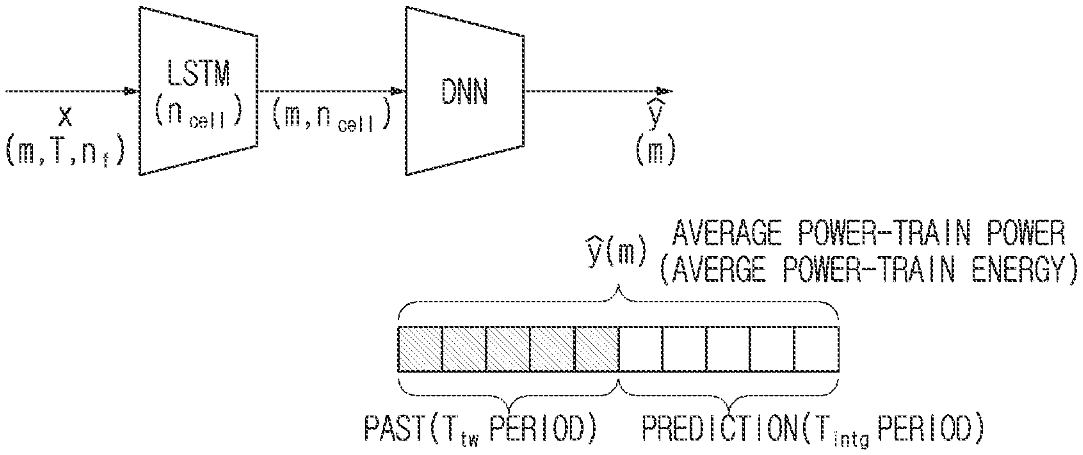
FIG. 7 is a view exemplifying an architecture of an artificial neural network that is one type of a drive prediction model of an embodiment.

In the present disclosure, as illustrated in FIG. 7, the learning module 204 can be exemplified to employ a specific type of artificial neural network as a drive prediction model. FIG. 7 is a view exemplifying an architecture of an artificial neural network that is one type of a drive prediction model of an embodiment.

FIG. 7 shows that an artificial neural network with a long short-term memory cell (LSTM) and a deep neural network (DNN) being cascaded, and used as a drive prediction model.

A selected type of existing driving data is learning data of the LSTM, and "m" in FIG. 7 can represent the number of learning data. In FIG. 7, "T" can be the size of a window used for learning with moving average of the existing driving data that is distributed in time series. "$n_f$" can be the number of features of existing driving data, and "$n_{cell}$" can be the number of memory cells of LSTM. A weight can be set to the number of obtained complexities applicable in the learning module 204. "y" can be an average predicted power-train power according to the exemplified drive prediction model of FIG. 7.

Next, the learning module 204 can initialize a weight of the drive prediction model (operation S135 in FIG. 4).

The weight allocated at operation S130 can be set as an initial value for learning of the selected artificial neural network.

Next, the learning module 204 can start learning of the drive prediction model (operation S140), train the drive prediction model (operation S150) until a loss function according to the drive prediction model converges on a reference value (operation S145), and thus determine the structure and weight of the drive prediction model (operation S155).

The learning module 204 can train the drive prediction model by using a correlation between the existing accumulated driving data and an actual power-train power that is output from the driving power system 108. An actual power-train power is a power-train power that is actually output according to existing driving data, and it can be a power-train power belonging to driving data or an average power-train power.

Figure 8:
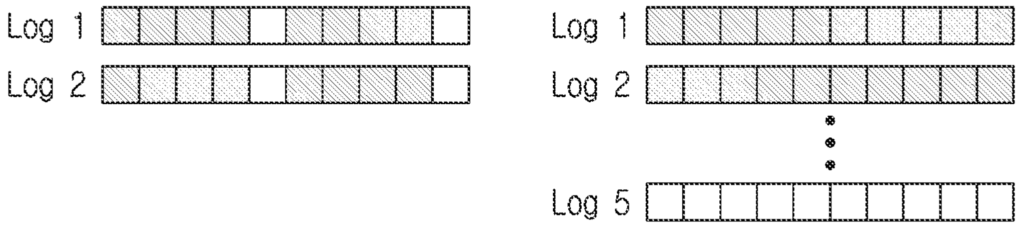
FIG. 8 is a view exemplifying the split of a plurality of driving data sets for train and test in the learning of a drive prediction model of an embodiment.

FIG. 8 is a view exemplifying the split of a plurality of driving data sets for train and test in the learning of a drive prediction model of an embodiment.

Figure 9:
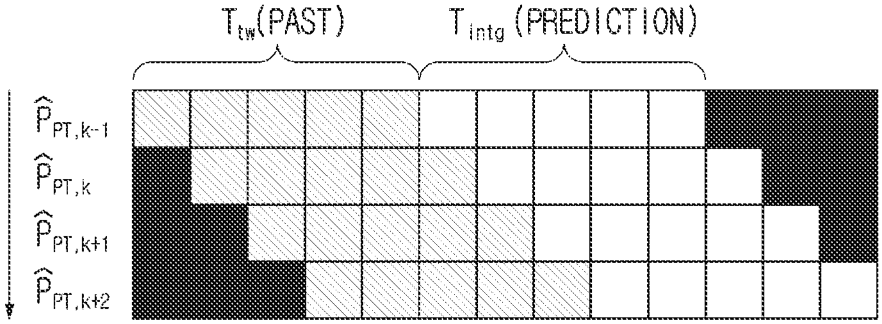
FIG. 9 is a view exemplifying a moving average of driving data of an embodiment.

A set of time-series driving data can be allocated to a window with a size corresponding to a predetermined/set/stored time period, and each log (Log 1~5) can be given to each window to which a driving data set is allocated. Specifically, as exemplified in FIG. 9, as a window is moved sequentially, a time-series driving data set corresponding to each time period can be allocated to the moved window. As exemplified in FIG. 9, while a window applied to average power-train powers $\overline{P}_{PT,k-1}$, $\overline{P}_{PT,k}$, $\overline{P}_{PT,k+1}$ and $\overline{P}_{PT,k+2}$ respectively is moved, an average power-train power according to an average of a corresponding driving data set can correspond to it. A log can be sequentially given to a window. FIG. 9 is a view exemplifying a moving average of driving data.

For the learning of a drive prediction model exemplified in FIG. 7, a set of driving data can be split into a data set for train and a data set for test. A selected drive prediction model can be trained by using a data set for train so that the structure and weight of the drive prediction model can be set. The drive prediction model with its structure and weight thus set can be tested by using a data set for test so that the structure and weight can be modified. Additionally, the drive prediction model, which has been completely tested, can also be retested by using all the data sets for train and test.

As in (a) of FIG. 8, the split of a data set can use a method of splitting a part of driving data sets in a log as a data set for train and utilizing a part of the remaining ones as a data set for test according to a proportion between train and test data sets. In the present disclosure, as in (b) of FIG. 8, according to the proportion, a corresponding number of logs for train can be split as a data set for train, and a corresponding number of logs for test can be used as a data set for test.

FIG. 8 exemplifies a proportion of 8:2 between train and test data sets, and as in (b) of FIG. 8, four logs are used as a data set for train, and one log is split as a data set for test.

In addition, for example, a loss function used to establish a drive prediction model through learning can use a mean squared error (MSE). Until a value of a loss function according to a drive prediction mode established by learning converges on a reference value, the structure and weight of a drive prediction model can be modified, and thus a final drive prediction model can be established.

Figure 10:
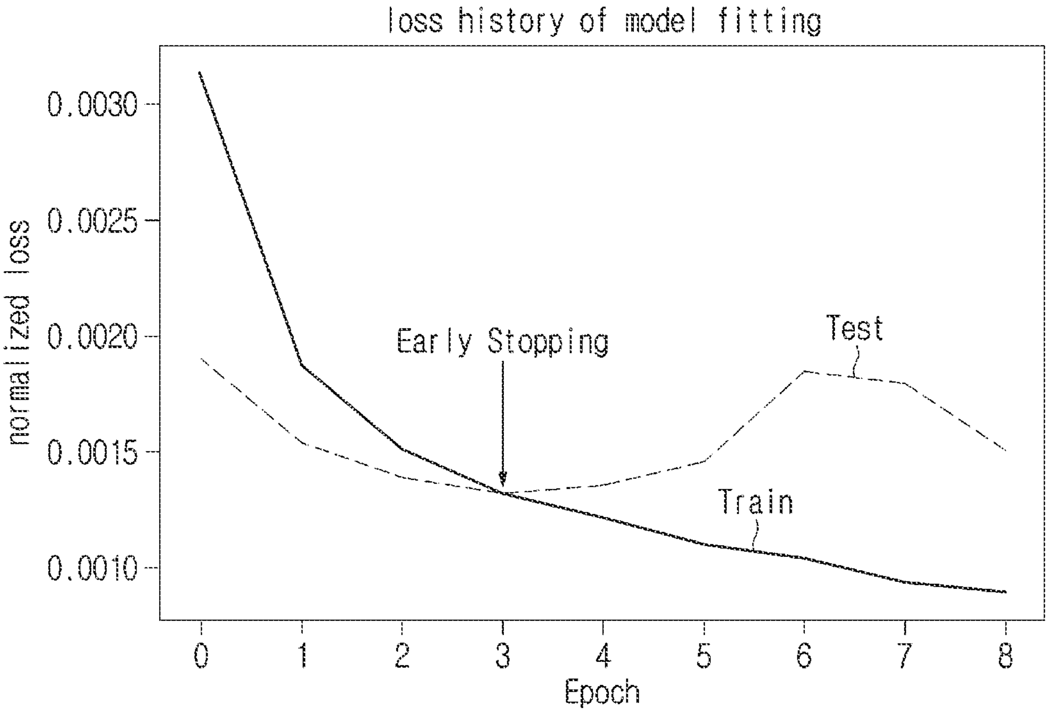
FIG. 10 is a view exemplifying a process for preventing overfitting in the learning of an artificial neural network that constitutes a drive prediction model of an embodiment.

In addition, in order to prevent overfitting in learning, early stopping or drop-out can be applied. In FIG. 10, early stopping is shown where learning of a drive prediction model using driving data is stopped in Epoch 3.

As a more concrete example, a simulation result of a drive prediction model established according to FIG. 7 to FIG. 10 is described. First, parameters applied to a drive prediction model are as follows. A window size is set as T=15, the number of data features is set as $n_f$=15, and the number of memory cells of LSTM is set as $n_{cell}$=24. DNN uses a two-stage network with 24 by 12 form, and the number of weights is set to about 6,000.

Accordingly, as for a simulation result of a drive prediction model, a coefficient of determination $R^2$ is 0.7, showing a meaningful result from engineering perspective. In addition, a prediction error σ, which is a standard deviation between a predicted value and a true value, is 3.3 kW. Such a prediction error is sufficient to distinguish low power (<10 kW), middle power (10-20 kW) and high power (>20 kW) situations.

Referring to FIG. 4 again, the server 200 can apply a drive prediction model with its structure and weight being determined to a moving object control software model (operation S160).

For example, the operation S160 can be performed in the learning module 204, and the moving object control software model can be software for controlling the moving object 100 with respect to driving, route, power, battery, and non-driving function module.

Next, the update server module 206 of the server 200 can deploy a moving object control software model to the moving object 100, and the moving object 100 can receive and execute a drive prediction model included in the software model (operation S165). For example, the moving object 100 can receive the software model through the transceiver unit 120 under the control of the communication controller 128.

As the learning module 204 of the server 200 possesses an existing drive prediction model of the moving object 100 at operation S125, if the update of a drive prediction model, not initial learning, is performed, the existing drive prediction model can be called (operation S170).

Similar to operations S140 to S155, the learning module 204 can train an existing model to update the existing drive prediction model. Like at operations S155 to S165, the drive prediction model thus completely updated is applied to a moving object control software model, and the software model can be deployed to the moving object 100 by the update server module 206 and be executed there.

Figure 11A:
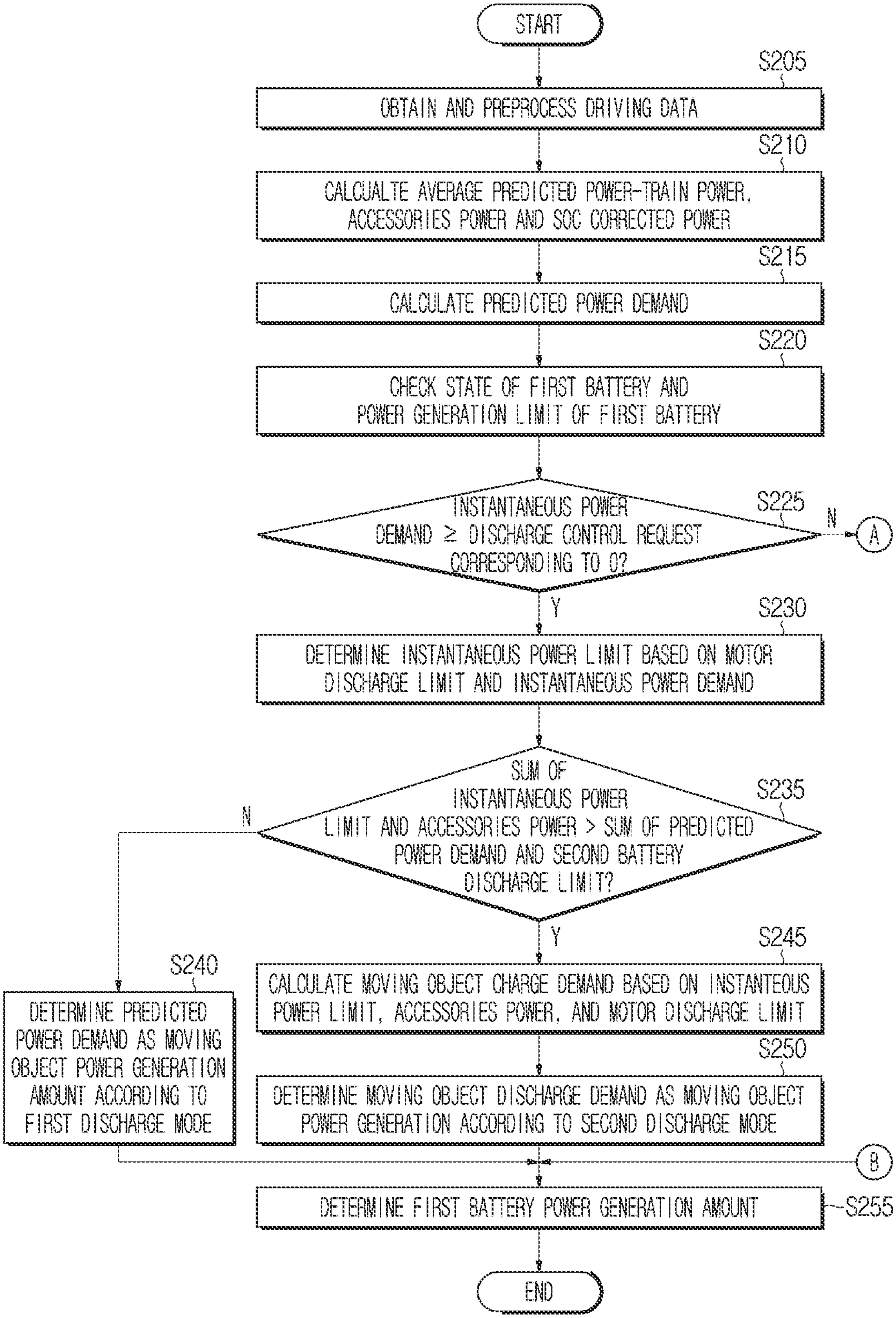
FIG. 11A and FIG. 11B are flowcharts associated with a battery control method according to another embodiment of the present disclosure.
Figure 11B:
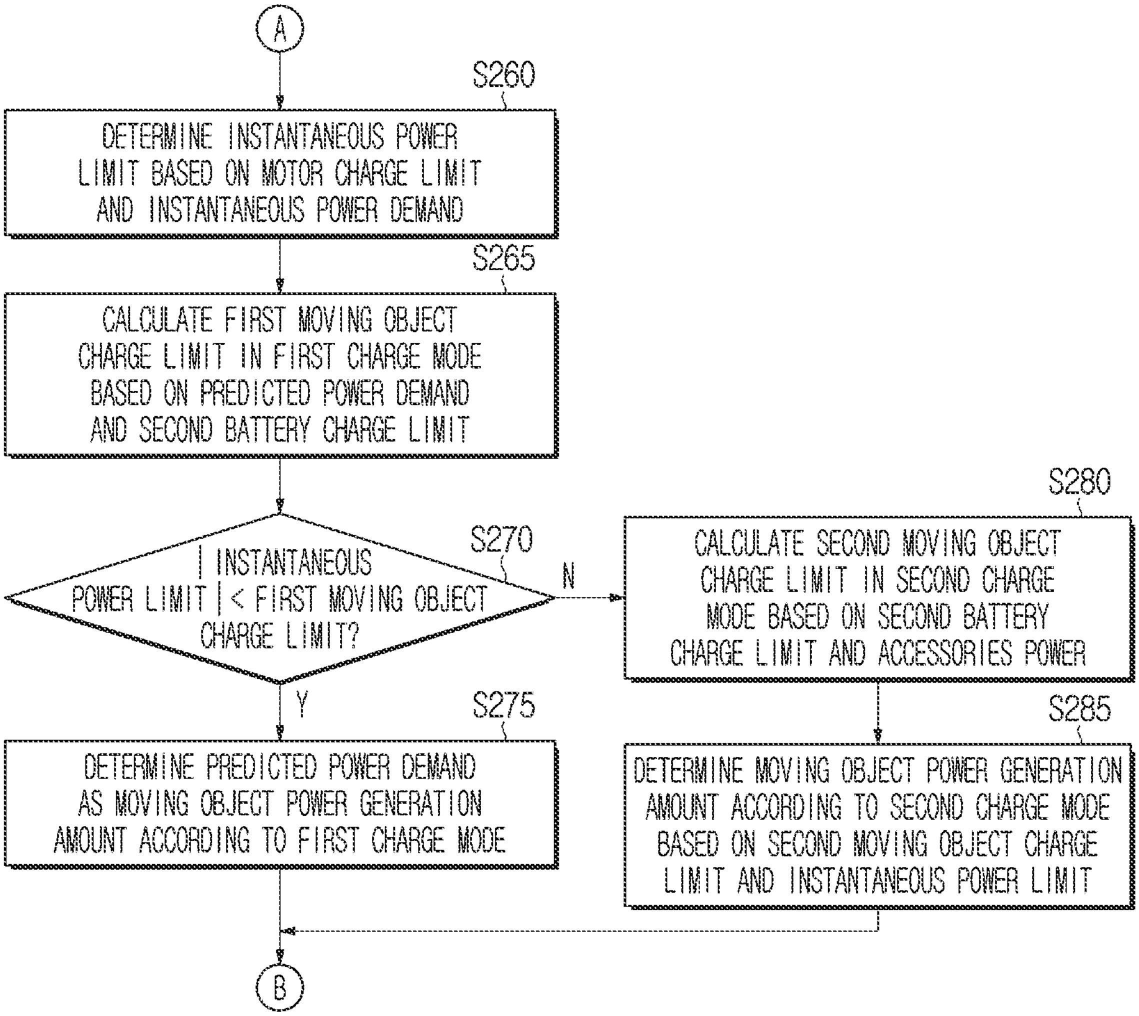
Figures 12, 13:
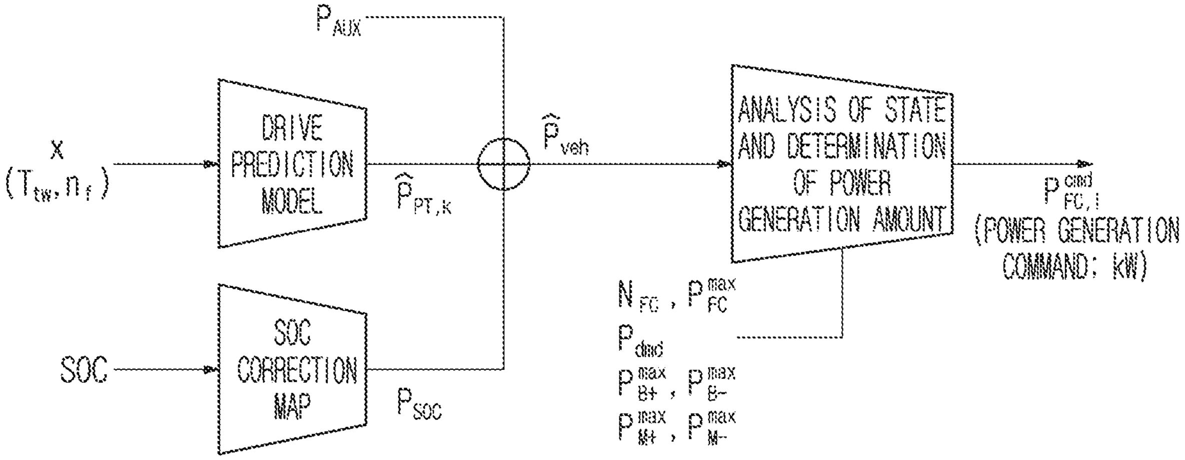
FIG. 12 is a view showing a process for determining a power generation amount of a first battery of an embodiment.
FIG. 13 is a view exemplifying an adjustment map of a state of charge (SOC) of a second battery of an embodiment.

Hereinafter, referring to FIG. 11A to FIG. 12, a battery control method according to an embodiment of the present disclosure will be described that is implemented by a battery control device. FIG. 11A and FIG. 11B are flowcharts associated with a battery control method according to an embodiment of the present disclosure. FIG. 12 is a view showing a process for determining a power generation amount of a first battery.

First, the processor 124 of the moving object 100 can obtain driving data generated during driving in real time and process the driving data (operation S205).

Like the driving data of which the type was described at operation S120 of FIG. 4, driving data can include at least one of weight data according to a use state, acceleration/deceleration control data, regeneration control data, speed data, gradient data, stop data, and power-train data. Detailed items of each piece of data can be detailed data listed at operation S120. In the present disclosure, a detailed item of each data set is exemplified as data below, but if appropriate for each type of data, it is not necessarily limited to the item below.

Data belonging to driving data can be obtained, as described at operation S120, through an acceleration/brake control value, its output value and a power-train power that are detected in the sensor unit 116, a user request using a driving operation component and the driving power system 108. In addition, a part of driving data can be generated based on various data. For example, as exemplified in FIG. 5, a user-demanded torque can be generated based on an acceleration demand value, a constant-speed demand value, a PTO power-train power and limit information.

In addition, through preprocessing, driving data can be provided as average data of data belonging to each type. For example, the processor 124 can generate average data every one minute for driving data that is generated at an interval of one second. Herein, the average data can be generated as an average of detailed data belonging to each type of driving data.

In addition, in order to check a change rate, a driving situation and a user's intention of acceleration/deceleration more accurately, at least a part of driving data can be generated, through preprocessing, as a scaled mean arc length for detailed data belonging to driving data. For example, an average speed, an average user-demanded torque, and an average power-train power can be used as driving data as they are, and a mean arc length value of those data can also be provided as driving data.

Next, the processor 124 can calculate an average predicted power-train power, an accessories power and an SOC correction power (operation S210).

An average predicted power-train power $\overline{P}_{PT}$ can be an average power-train power that a drive prediction model based on driving data expects in the driving power system 108. The drive prediction model is a model, which is transmitted from the server 200, and can use an artificial neural network that combines the LSTM and the DNN as exemplified in FIG. 7.

As exemplified in FIG. 9, a drive prediction model can calculate an average predicted power-train power, which is a predicted value $T_{intg}$, based on a moving average value $T_{tw}$ of driving data that is calculated by moving a window with a size corresponding to a predetermined/set/stored time period in driving data generated in time series. More specifically, the processor 124 can calculate an average predicted power-train power $\hat{P}_{PT,k-1}$, $\hat{P}_{PT,k}$, $\hat{P}_{PT,k+1}$, $\hat{P}_{PT,k+2}$ corresponding to a time period based on an average of driving data corresponding to the time period of a window moving in time series. According to an embodiment of the present disclosure, by using a drive prediction model based on an artificial intelligence, an average predicted power-train power can be adaptively generated according to a driving situation of the moving object 100.

An accessories power $P_{AUX}$ can be a power that is consumed in real time in a non-driving power system at a user request during driving and a setting of the moving object 100. An accessories power can be calculated by measuring a power that is allocated to the accessories 118 and the second battery 104.

A SOC correction power $P_{SOC}$ can be a corrected power based on a current SOC of an electric battery, that is, the second battery 104. Correction of power can be performed by determining a corrected power of the second battery 104, which matches a SOC of the second battery 104, by using, for example, the correction map exemplified in FIG. 13. FIG. 13 is a view exemplifying an adjustment map of a state of charge (SOC) of a second battery of an embodiment. Specifically, the correction map exemplified in FIG. 13 can be a table showing a correction parameter to be subtracted from a power amount of the second battery 104, which corresponds to a SOC of the second battery 104. Accordingly, the SOC correction power $P_{SOC}$ can be calculated by subtracting a corresponding parameter in the correction map of FIG. 13 from a power amount of the second battery 104 corresponding to a current SOC. As in FIG. 2, a correction map can be stored in the memory 122. Power correction can be performed in various manners without being limited to the above-descried example.

When power generation control is performed based on an average power-train power, the SOC of the second battery 104 can oscillate or increase or decrease with a constant trend. To maintain the SOC of the second battery 104 within a desirable control section, a correction map used for an SOC correction power can be determined to be a positive value that derives the SOC in an upward direction within that SOC area. In addition, the correction map for an SOC correction power can be determined to be a negative value that derives the SOC in a downward direction in the SOC area.

Next, the processor 124 can calculate a predicted power demand of the moving object 100 based on an average predicted power-train power, an accessories power and an SOC correction power (operation S215).

As exemplified in FIG. 12, a predicted power demand $\hat{P}_{veh}$ can be obtained by $\hat{P}_{PT}+P_{AUX}+P_{SOC}$ which is a sum of an average predicted power-train power, an accessories power, and an SOC correction power.

Next, the processor 124 can check a state of the first battery 102 and a power generation limit of the first battery 102 (operation S220).

Figure 3:
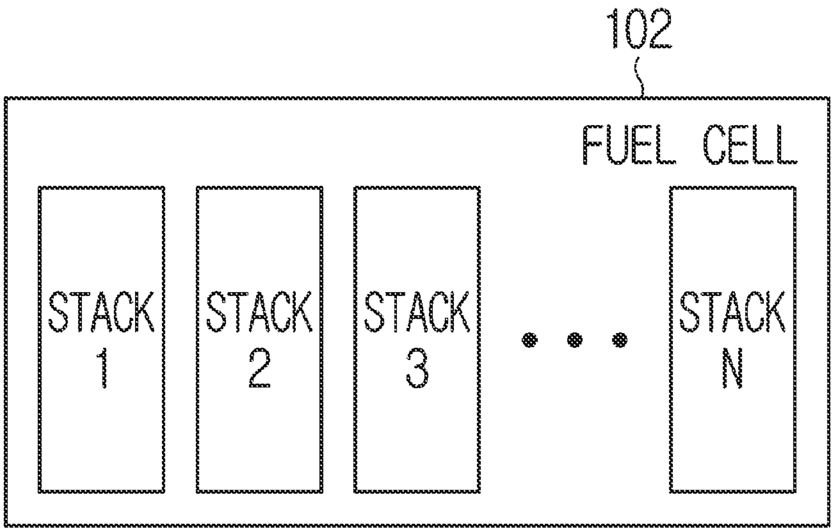
FIG. 3 is a view exemplifying a schematic configuration of a first battery of an embodiment.

As exemplified in FIG. 3, a fuel cell, which is the first battery 102, can have a plurality of stacks. As exemplified in FIG. 12, the processor 124 can check the number of stacks NFC of the fuel cell 102 under normal operation and a power generation limit $$P_{FC,i}^{max}$$

of each stack i in order to identify a state of the fuel cell 102. The power generation limit $$P_{FC}^{max}$$

of the fuel cell 102 can be calculated by $$P_{FC}^{max}=\sum_{i=1}^{N_{FC}}P_{FC,i}^{max}.$$

Next, the processor 124 can determine whether or not the driving power system 108 of the moving object 100 requires discharge control or charge control in real time (operation S225).

Discharge control can refer to consuming power from the perspective of the driving power system 108. For example, discharge control can mean that the first and second motor units 112*a* and 112*b* of the driving power system 108 receive and consume power from outside, for example, from the second battery 104, while generating a constant torque according to an acceleration control request among driving control requests. Charge control can refer to being charged with power from the perspective of the driving power system 108. For example, charge control can mean that the first and second motor units 112*a* and 112*b* charge an external module, for example, the second battery 104, while generating power by generating a reverse torque according to a deceleration control or regenerative brake request among driving control requests.

In order to determine discharge control or charge control, the processor 124 can check whether or not an instantaneous power demand $P_{dmd}$ is 0 which is required in real time, for example, in the driving power system 108. Specifically, in case of $P_{dmd}\geq 0$, the processor 124 can determine that discharge control is required in the driving power system 108. In case of $P_{dmd}<0$, the processor 124 can determine that charge control is required in the driving power system 108. Not only in the above-described discharge control and charge control, but also in the description of an embodiment of the present disclosure, it is assumed that discharge has a positive (+) value and charge has a negative (−) value. In addition, to clearly show expected discharge, a part of a corresponding term can be marked with +, and to show expected charge, a part of a relevant term can be marked with −.

In case a charge control demand is determined (Y of operation S225), the processor 124 can determine an instantaneous power limit based on a discharge limit of the motor units 112*a* and 112*b* and an instantaneous power demand (operation S230).

The motor discharge limit $$P_{M+}^{max}$$

of the motor units 112*a* and 112*b* is information constituting power system limit information associated with charge/discharge of the driving power system 108 and can be generated or set based on an operating state of the motor units 112*a* and 112*b* during driving and limit information that is stored in the memory 122.

Limit information is information associated with the charge/discharge of the second battery 104 and the driving power system 108 respectively and can include the limit information of the second battery 104 and power system limit information. Limit information can be generated or set based on an operating state of the driving power system 108 and the second battery 104 during driving and relevant information stored in the memory 122. As exemplified in FIG. 12, power system limit information is information associated with a charge/discharge limit of motor units and can include a motor discharge limit $$P_{M+}^{max}$$

and a motor charge limit $$P_{M-}^{max}.$$

As exemplified in FIG. 12, the second battery limit information can include a second battery discharge limit $$P_{B+}^{max}$$

and a second battery charge limit $$P_{B-}^{max}.$$

In relation to operation S230, the processor 124 can determine an instantaneous power limit $$P_{dmd}^{lmt}$$

through Equation 2 below by considering a discharge limit of the motor units 112*a* and 112*b*. As described above, $$P_{M+}^{max}$$

can be a motor discharge limit, and $P_{dmd}$ can be an instantaneous power demand. In an embodiment of the present disclosure, the instantaneous power limit in Equation 2 can also be referred to as an actual power of discharge control.

$$P_{dmd}^{lmt} = \min(P_{dmd}, P_{M+}^{max}) \quad \text{[Equation 2]}$$

Next, the processor 124 can determine a discharge mode by comparing a first sum of an instantaneous power limit and an accessories power and a second sum of a predicted power demand and a second battery discharge limit (S235).

Specifically, the instantaneous power limit, the accessories power, the predicted power demand, and the second battery discharge limit are marked by $$P_{dmd}^{lmt}, P_{AUX}, \hat{P}_{veh}, P_{B+}^{max}$$

respectively, and in case of $$P_{dmd}^{lmt} + P_{AUX} \le \hat{P}_{veh}, P_{B+}^{max},$$

the first sum can be determined to be equal to or lower than the second sum, and the processor 124 can determine the discharge mode as a first discharge mode. The first discharge mode can be referred to as a weak discharge mode.

On the other hand, in case of $$P_{dmd}^{lmt} + P_{AUX} > \hat{P}_{veh}, P_{B+}^{max},$$

the first sum can be determined to be larger than the second sum, and the processor 124 can determine the discharge mode as a second discharge mode. The second discharge mode is implemented as stronger discharge than the first discharge mode and can be referred to as a strong discharge mode.

In case the first discharge mode is determined (N of operation S235), the processor 124 can determine a moving object power generation amount based on a predicted power demand (operation S240).

Specifically, if the moving object power generation amount and the predicted power demand are marked by $$P_{veh}^{cmd} \text{ and } \hat{P}_{veh}$$

respectively, $$P_{veh}^{cmd} = \hat{P}_{veh}$$

can be determined.

In case the second discharge mode is determined (Y of operation S235), the processor 124 can calculate a moving object discharge demand based on an instantaneous power limit, an accessories power, and a second battery charge limit (operation S245).

Specifically, if the instantaneous power limit, the accessories power, the second battery discharge limit, and the moving object discharge demand are marked by $$P_{dmd}^{lmt}, P_{AUX}, P_{B+}^{max}, \text{ and } P_{veh+}^{req}$$

respectively, the processor 124 can calculate the moving object discharge demand by $$P_{veh+}^{req} = P_{dmd}^{lmt} + P_{AUX} - P_{B+}^{max} + C_+.$$

Here, $C_+$ can be a preset strong discharge margin constant and can be a margin that is applied to the second discharge mode.

Next, the processor 124 can determine a moving object power generation amount based on the moving object discharge demand (operation S250).

Specifically, if the moving object power generation amount and the moving object discharge demand are marked by $$P_{veh}^{cmd} \text{ and } P_{veh+}^{req}$$

respectively, $$P_{veh}^{cmd} = P_{veh+}^{req}$$

can be determined.

Next, the processor 124 can determine a power generation amount of the first battery 102 based on a moving object power generation amount determined based on the first or second discharge mode and a power generation limit of the first battery 102 (operation S255).

For example, as a power generation amount of the fuel cell 102, which is a first battery, is calculated as a power generation amount per stack $$P_{FC,i}^{cmd}$$

of the fuel cell 102, a power generation amount of all the stacks of the fuel cell 102 under normal operation can be determined. Specifically, as shown in Equation 3 below, the power generation amount per stack $$\frac{1}{N_{FC}} P_{veh}^{cmd}$$

of the fuel cell 102 can be determined by a minimum value between a moving object power generation amount per stack $$P_{FC,i}^{cmd}$$

under normal operation of the fuel cell 102 and a power generation limit $$P_{FC,i}^{max}$$

of each stack i of the fuel cell 102. Here, NFC can be the number of stacks of the fuel cell 102 under normal operation.

$$P_{FC,i}^{cmd} = \min\left(\frac{1}{N_{FC}} P_{veh}^{cmd}, P_{FC,i}^{max}\right) \quad \text{[Equation 3]}$$

Accordingly, a power generation amount of the first battery 102 can be determined based on a moving object power generation amount according to a determined discharge mode, a per-stack state of the first battery 102, and a per-stack power generation limit of the first battery 102.

In case a discharge control demand is determined (N of operation S225), the processor 124 can perform the processes of FIG. 11B.

First, the processor 124 can determine an instantaneous power limit based on a discharge limit of the motor units 112*a* and 112*b* and an instantaneous power demand (operation S260).

Specifically, the processor 124 can determine an instantaneous power limit $$P_{dmd}^{lmt}$$

through Equation 4 below by considering a charge limit of the motor units 112*a* and 112*b*.

$$P_{M-}^{max}$$

can be a motor charge limit, and $P_{dmd}$ can be an instantaneous power demand. In an embodiment of the present disclosure, the instantaneous power limit in Equation 4 can also be referred to as an actual power of discharge control.

$$P_{dmd}^{lmt} = -1 \cdot \min(|P_{dmd}|, |P_{M-}^{max}|) \quad \text{[Equation 4]}$$

Next, the processor 124 can calculate a first moving object charge limit in the first charge mode based on a predicted power demand and a second battery charge limit (operation S265).

The first charge mode can be referred to as a weak charge mode, and the first moving object charge limit can be an estimated limit to which the moving object 100 is charged in the first charge mode. Specifically, the processor 124 can determine the first moving object charge limit $$P_{veh-}^{max}$$

through Equation 5 below.

$$P_{B-}^{max}$$

can be the second battery charge limit, and $\hat{P}_{veh}$ can be a predicted power demand.

$$P_{veh-}^{max} = \max(0, |P_{B-}^{max}| - \hat{P}_{veh}) \quad \text{[Equation 5]}$$

Next, the processor 124 can determine a charge mode by comparing an absolute value of an instantaneous power limit and a first moving object charge limit (S270).

Specifically, if the instantaneous power limit and the first moving object charge limit are marked by $$P_{dmd}^{lmt} \text{ and } P_{veh-}^{max}$$

respectively, when $$|P_{dmd}^{lmt}| < P_{veh-}^{max},$$

the processor 124 can determine the charge mode as a first charge mode. On the other hand, when $$\left|P_{dmd}^{lmt}\right| \geq P_{veh-}^{max},$$

the processor 124 can determine the charge mode as a second charge mode. If the second charge mode is implemented with stronger charge than the first charge mode, the second charge mode can be referred to as a strong charge mode.

In case the first charge mode is determined (Y of second charge mode S270), the processor 124 can determine a moving object power generation amount based on a predicted power demand (operation S275).

Specifically, if the moving object power generation amount and the predicted power demand are marked by $$P_{veh}^{cmd}$$

and $\hat{P}_{veh}$ respectively, $$P_{veh}^{cmd} = \hat{P}_{veh}$$

can be determined.

In case the second charge mode is determined (N of operation S270), the processor 124 can determine a second moving object charge demand based on a second battery charge limit and an accessories power (operation S280).

Specifically, if the second battery charge limit, the accessories power, and the second moving object charge demand are marked by $$P_{B-}^{max},\ P_{AUX},\ \text{and}\ P_{veh-}^{max}$$

respectively, the processor 124 can calculate the moving object charge demand by $$P_{veh-}^{max} = \left|P_{B-}^{max}\right| + P_{AUX} - C\_.$$

Here, C_ can be a preset strong charge margin constant and can be a margin that is applied to the second charge mode.

Next, the processor 124 can determine a moving object power generation amount based on the second moving object charge demand and the instantaneous power limit (operation S285).

Specifically, if the second moving object charge demand, the instantaneous power limit, and the moving object power generation amount are marked by $$P_{veh-}^{max},\ P_{dmd}^{lmt},\ \text{and}\ P_{veh}^{cmd}$$

respectively, the processor 124 can calculate the moving object power generation amount by $$P_{veh}^{cmd} = \max\left(0,\ P_{veh-}^{max} - \left|P_{dmd}^{lmt}\right|\right).$$

Through operation S255 of FIG. 11A, the processor 124 can determine a power generation amount of the first battery 102 based on a moving object power generation amount determined based on the first or second charge mode and a power generation limit of the first battery 102.

A first battery power generation amount based on a moving object power generation amount according to a first or second charge mode can be determined in a similar way to operation S255. Accordingly, a power generation amount of the first battery 102 can be determined based on a moving object power generation amount according to a determined charge mode, a per-stack state of the first battery 102, and a per-stack power generation limit of the first battery 102.

Figure 14A:
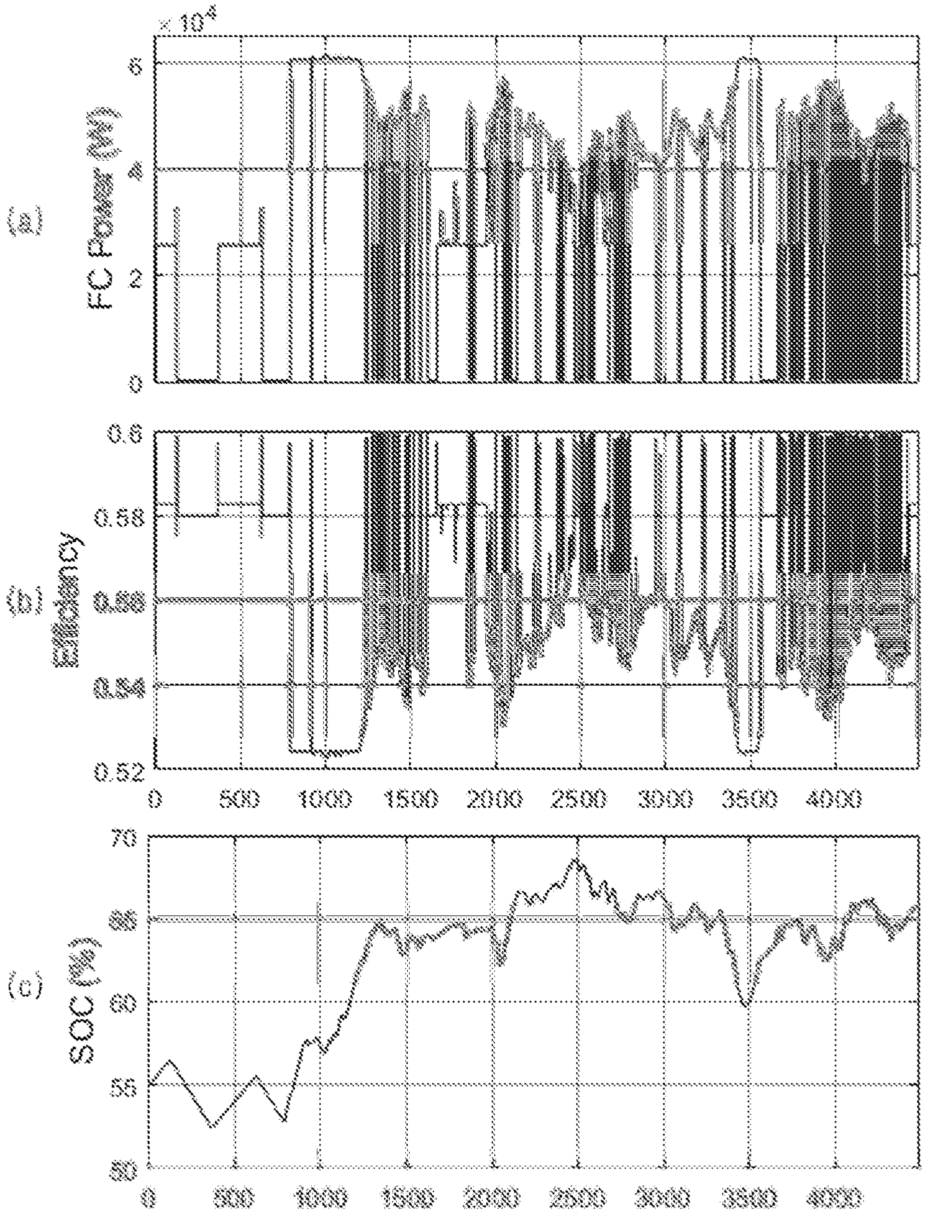
FIG. 14A is a graph showing the power generation amount, generation efficiency, and SOC of an electric battery according to a conventional battery control method of an embodiment.

FIG. 14A is a graph showing an example of the power generation amount, generation efficiency, and SOC of an electric battery according to a conventional battery control method. In contrast, FIG. 14B is a graph showing and example of the power generation amount, generation efficiency, and SOC of an electric battery according to a battery control method of an embodiment of the present disclosure.

The conventional battery control method according to FIG. 14A is implemented by using a power generation amount map, which tabulates a power generation amount of a fuel cell according to a power demand of a moving object and SOC of an electric battery, to determine a power amount defined in the map as the power generation amount of the fuel cell.

Figure 14B:
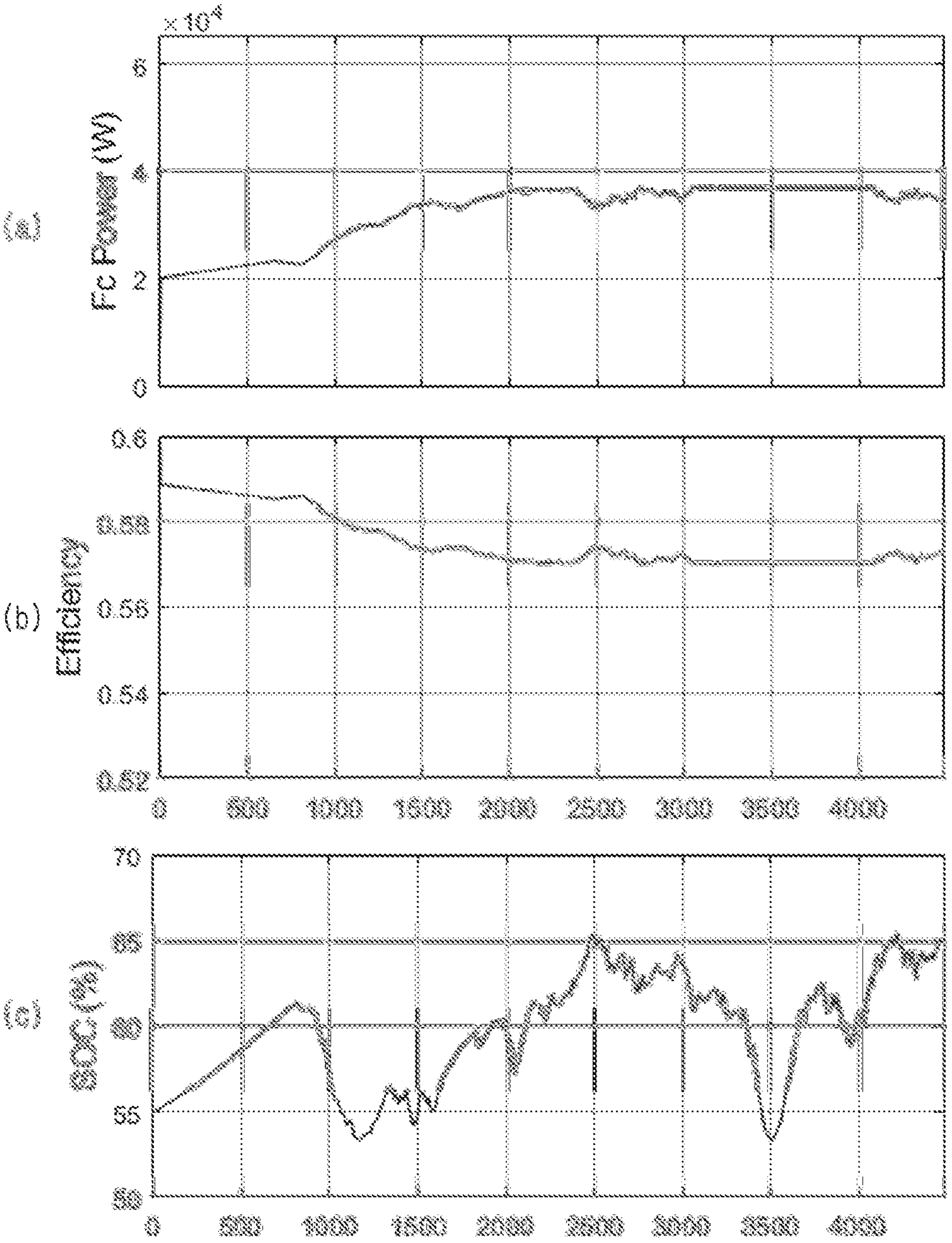
FIG. 14B is a graph showing the power generation amount, generation efficiency, and SOC of an electric battery according to a battery control method of an embodiment of the present disclosure.

A battery control method according to FIG. 14B of an embodiment in the present disclosure uses a drive prediction model, which is trained by reflecting a driving situation according to FIG. 4, as in FIG. 11A and FIG. 11B, to generate an average predicted power-train power according to a driving situation of a moving object and to determine a power generation amount of a fuel cell based on the average predicted power-train power, an accessories power, an SOC correction power, and a charge/discharge limit of an electric battery and a motor.

When comparing power generation amounts of fuel cells illustrated in (a) of FIG. 14A and FIG. 14B, the conventional power generation amounts have a very drastic change, while the power generation amounts according an embodiment to the present disclosure have a low deviation because a driving situation and various states of a moving object can be predicted. From the perspective of SOC of an electric battery illustrated in (c) of FIG. 14A and FIG. 14B, the conventional SOC is also higher than that of the method according to an embodiment of the present disclosure. As the conventional method charges an electric battery with a power generation amount with an excessively fixed value without considering a driving situation and a state of a moving object, it has an unnecessary SOC. On the other hand, as the method according to an embodiment of the present disclosure charges an electric battery with an adaptive power generation amount for a driving situation and a state of a moving object, it has a suitable SOC for a driving situation.

In consideration of power generation efficiency of fuel cells as illustrated in (b) of FIG. 14A and FIG. 14B, the conventional method shows a very large deviation of efficiency, while the method according to an embodiment of the present disclosure shows a significantly small deviation of efficiency. A power generation efficiency can be a value obtained by dividing a fuel cell power generation amount by a hydrogen consumption. When a hydrogen consumption is thus calculated, the hydrogen fuel efficiency can be improved by 5 to 6 percent due to the improvement of effective efficiency. In addition, the method according to an embodiment of the present disclosure can significantly reduce power generation on-off chattering as compared with the conventional method.

Effects obtained in an embodiment of the present disclosure are not necessarily limited to the above-mentioned effects, and other effects not mentioned above can be clearly understood by those skilled in the art from the description.

While the exemplary methods of embodiments of the present disclosure described above are represented as a series of operations for clarity of description, it is not intended to limit the order in which the operations are performed, and the operations can be performed simultaneously or in different order as necessary/desired/preferred/optimized. In order to implement the method according to an embodiment of the present disclosure, the described operations can further include other operations, can include remaining operations except for some of the operations, or can include other additional operations except for some of the operations.

The various embodiments of the present disclosure are not a list of all possible combinations and are intended to describe representative embodiments of the present disclosure, and the matters described in the various embodiments can be applied independently or in combination of two or more.

In addition, various embodiments of the present disclosure can be implemented in hardware, firmware, software, or a combination thereof. In the case of implementing embodiments by hardware, embodiments of the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon, and executable on the apparatus or the computer.

What is claimed is:

1. A method for battery control, the method comprising:

obtaining a predicted power demand based on an average predicted power-train power and an accessories power, wherein the average predicted power-train power is generated by a drive prediction model based on driving data of a moving object with a second battery receiving power from a first battery;

determining whether or not discharge control or charge control is a required state in real time in a driving power system of the moving object;

in response to the discharge control being the required state, determining a discharge mode based on the predicted power demand, an actual power of the discharge control, the accessories power, and discharge limit information associated with discharge of the second battery and the driving power system, determining, based on the determined discharge mode, a first power generation amount of the first battery, causing the first battery to generate power based on the determined first power generation amount, and discharging power from the second battery in accordance with the determined discharge mode; and in response to the charge control being the required state, determining a charge mode based on the predicted power demand, an actual power of the charge control, and charge limit information, determining, based on the determined charge mode, a second power generation amount of the first battery, causing the first battery to generate power based on the determined second power generation amount, and charging the second battery in accordance with the determined charge mode, wherein determining of whether or not the discharge control or the charge control is the required state comprises:

determining that the discharge control is the required state, in response to an instantaneous power demand in real time in the driving power system being equal to or greater than zero; and determining that the charge control is the required state, in response to the instantaneous power demand being smaller than zero, and wherein the charge limit information includes a second battery charge limit and a power system charge limit of the driving power system, wherein in response to the charge control being the required state, the actual power of the charge control is an instantaneous power limit that is determined based on the instantaneous power demand and the power system charge limit, wherein the charge mode is determined as a first charge mode, in response to an absolute value of a first moving object charge limit being larger than the instantaneous power limit, wherein the charge mode is determined as a second charge mode that is implemented with stronger charge than the first charge mode, in response to the first moving object charge limit being equal to or smaller than the instantaneous power limit by absolute value, and wherein the first moving object charge limit is an estimated limit, to which the moving object is charged in the first charge mode, and is determined based on the predicted power demand and the second battery charge limit.

2. The method of claim 1, wherein the average predicted power-train power is an average power-train power that is predicted in the driving power system, and the accessories power is a power that is consumed in a non-driving power system of the moving object, wherein the driving data includes average data for one of or any combination of weight data according to a use state of the moving object, acceleration or deceleration control data associated with acceleration and braking control requested to the moving object, regeneration control data associated with regenerative braking control of the moving object, speed data of the moving object, gradient data associated with a gradient on a driving route of the moving object, stop data associated with stop control of the moving object, and drive data associated with a power-train power in the driving power system, and wherein at least a part of the driving data is generated by being processed as a scaled mean arc length for data belonging to the driving data.

3. The method of claim 1, wherein the discharge limit information comprises a second battery discharge limit and a power system discharge limit of the driving power system, wherein, in response to the discharge control being the required state, the actual power of the discharge control is an instantaneous power limit that is determined based on the instantaneous power demand and the power system discharge limit, wherein the discharge mode is determined as a first discharge mode, in response to a first sum of the instantaneous power limit and the accessories power being equal to or smaller than a second sum of the predicted power demand and the second battery discharge limit, and wherein the discharge mode is determined as a second discharge mode that is executed as stronger discharge than the first discharge mode, in response to the first sum being greater than the second sum.

4. The method of claim 3, wherein the determining of the first power generation amount of the first battery based on the determined discharge mode comprises:

in response to the discharge mode being determined as the first discharge mode, determining the first power generation amount of the first battery based on the predicted power demand; and in response to the discharge mode being determined as the second discharge mode, determining the first power generation amount based on the instantaneous power limit, the accessories power, and the second battery discharge limit.

5. The method of claim 1, wherein the determining of the second power generation amount of the first battery based on the determined charge mode comprises:

in response to the charge mode being determined as the first charge mode, determining the second power generation amount of the first battery based on the predicted power demand; and in response to the charge mode being determined as the second charge mode, determining the second power generation amount of the first battery based on the instantaneous power limit, the accessories power, and the second battery charge limit.

6. The method of claim 1, wherein the determining of the first power generation amount of the first battery based on the determined discharge mode comprises determining the first power generation amount of the first battery based on a moving object power generation amount according to the determined discharge mode, a state of the first battery, and a power generation limit of the first battery, and wherein the determining of the second power generation amount of the first battery based on the determined charge mode comprises determining the second power generation amount of the first battery based on a moving object power generation amount according to the determined charge mode, a state of the first battery, and a power generation limit of the first battery.

7. The method of claim 1, wherein the obtaining of the predicted power demand comprises obtaining the predicted power demand based on a state of charge (SOC) corrected power, which is corrected based on a current SOC of the second battery, together with the average predicted power-train power and the accessories power.

8. The method of claim 1, wherein the drive prediction model is generated from a server outside the moving object, or is updated in the server and then is received from the server, and wherein the drive prediction model is built by learning of an artificial intelligence model that uses existing driving data that is generated from past driving of the moving object, and the learning is performed based on a moving average value of the existing driving data, which is calculated by moving a window with a selected size in the existing driving data that is generated in time series.

9. A device for battery control, the device comprising:

a memory configured to store at least one instruction; and a processor configured to execute the at least one instruction stored in the memory, wherein the processor is configured to:

obtain a predicted power demand based on an average predicted power-train power and an accessories power, wherein the average predicted power-train power is generated by a drive prediction model based on driving data of a moving object with a second battery receiving power from a first battery, determine whether or not discharge control or charge control is a required state in real time in a driving power system of the moving object, in response to the discharge control being the required state, determine a discharge mode based on the predicted power demand, an actual power of the discharge control, the accessories power and discharge limit information associated with discharge of the second battery and the driving power system, determine, based on the determined discharge mode, a first power generation amount of the first battery, cause the first battery to generate power based on the determined first power generation amount, and discharge power from the second battery in accordance with the determined discharge mode, and in response to the charge control being the required state, determine a charge mode based on the predicted power demand, an actual power of the charge control and charge limit information, determine, based on the determined charge mode, a second power generation amount of the first battery, cause the first battery to generate power based on the determined second power generation amount, and charge the second battery in accordance with the determined charge mode, wherein determining of whether or not the discharge control or the charge control is the required state comprises:

determining that the discharge control is the required state, in response to an instantaneous power demand in real time in the driving power system being equal to or greater than zero; and determining that the charge control is the required state, in response to the instantaneous power demand being smaller than zero, and wherein the charge limit information includes a second battery charge limit and a power system charge limit of the driving power system, wherein in response to the charge control being the required state, the actual power of the charge control is an instantaneous power limit that is determined based on the instantaneous power demand and the power system charge limit, wherein the charge mode is determined as a first charge mode, in response to an absolute value of a first moving object charge limit being larger than an absolute value of the instantaneous power limit, wherein the charge mode is determined as a second charge mode that is implemented with stronger charge than the first charge mode, in response to the first moving object charge limit being equal to or smaller than the instantaneous power limit by absolute value, and wherein the first moving object charge limit is an estimated limit, to which the moving object is charged in the first charge mode, and is determined based on the predicted power demand and the second battery charge limit.

10. The device of claim 9, wherein the average predicted power-train power is an average power-train power that is predicted in the driving power system, and the accessories power is a power that is consumed in a non-driving power system of the moving object, wherein the driving data includes average data for one of or any combination of weight data according to a use state of the moving object, acceleration or deceleration control data associated with acceleration and braking control requested to the moving object, regeneration control data associated with regenerative braking control of the moving object, speed data of the moving object, gradient data associated with a gradient on a driving route of the moving object, stop data associated with stop control of the moving object, and drive data associated with a power-train power in the driving power system, and wherein at least a part of the driving data is generated by being processed as a scaled mean arc length for data belonging to the driving data.

11. The device of claim 9, wherein the discharge limit information includes a second battery discharge limit and a power system discharge limit of the driving power system, wherein, in response to the discharge control being the required state, the actual power of the discharge control is an instantaneous power limit that is determined based on the instantaneous power demand and the power system discharge limit, wherein the discharge mode is determined as a first discharge mode, in response to a first sum of the instantaneous power limit and the accessories power being equal to or smaller than a second sum of the predicted power demand and the second battery discharge limit, and wherein the discharge mode is determined as a second discharge mode that is executed as stronger discharge than the first discharge mode, in response to the first sum being greater than the second sum.

12. The device of claim 11, wherein the determining of the first power generation amount of the first battery based on the determined discharge mode comprises:

in response to the discharge mode being determined as the first discharge mode, determining the first power generation amount of the first battery based on the predicted power demand; and in response to the discharge mode being determined as the second discharge mode, determining the first power generation amount based on the instantaneous power limit, the accessories power, and the second battery discharge limit.

13. The device of claim 9, wherein the determining of the second power generation amount of the first battery based on the determined charge mode comprises:

in response to the charge mode being determined as the first charge mode, determining the second power generation amount of the first battery based on the predicted power demand; and in response to the charge mode being determined as the second charge mode, determining the second power generation amount based on the instantaneous power limit, the accessories power, and the second battery charge limit.

14. The device of claim 9, wherein the determining of the first power generation amount of the first battery based on the determined discharge mode comprises determining the first power generation amount of the first battery based on a moving object power generation amount according to the determined discharge mode, a state of the first battery, and a power generation limit of the first battery, and wherein the determining of the second power generation amount of the first battery based on the determined charge mode comprises determining the second power generation amount of the first battery based on a moving object power generation amount according to the determined charge mode, a state of the first battery, and a power generation limit of the first battery.

15. The device of claim 9, wherein the drive prediction model is generated from a server outside the moving object, or is updated in the server and then is received from the server, and wherein the drive prediction model is built by learning of an artificial intelligence model that uses existing driving data that is generated from past driving of the moving object, and the learning is performed based on a moving average value of the existing driving data, which is calculated by moving a window with a selected size in the existing driving data that is generated in time series.

16. A device for battery control, the device comprising:

a memory configured to store at least one instruction; and a processor configured to execute the at least one instruction stored in the memory, wherein the processor is configured to:

obtain a predicted power demand based on a state of charge (SOC) corrected power of a first battery, an average predicted power-train power, and an accessories power, wherein the average predicted power-train power is generated by a drive prediction model based on driving data of a moving object with a second battery receiving power from the first battery, determine whether or not discharge control or charge control is a required state in real time in a driving power system of the moving object, in response to the discharge control being the required state, determine a discharge mode based on the predicted power demand, an actual power of the discharge control, the accessories power, and charge limit information associated with discharge of the second battery and the driving power system, determine, based on the determined discharge mode, a first power generation amount of the first battery, cause the first battery to generate power based on the determined first power generation amount, and discharge power from the second battery in accordance with the determined discharge mode, and in response to the charge control being the required state, determine a charge mode based on the predicted power demand, an actual power of the charge control and charge limit information, determine, based on the determined charge mode, a second power generation amount of the first battery, cause the first battery to generate power based on the determined second power generation amount, and charge the second battery in accordance with the determined charge mode, wherein determining of whether or not the discharge control or the charge control is the required state comprises:

determining that the discharge control is the required state, in response to an instantaneous power demand in real time in the driving power system being equal to or greater than zero; and determining that the charge control is the required state, in response to the instantaneous power demand being smaller than zero, and wherein the charge limit information includes a second battery charge limit and a power system charge limit of the driving power system, wherein in response to the charge control being the required state, the actual power of the charge control is an instantaneous power limit that is determined based on the instantaneous power demand and the power system charge limit, wherein the charge mode is determined as a first charge mode, in response to an absolute value of a first moving object charge limit being larger than an absolute value of the instantaneous power limit, wherein the charge mode is determined as a second charge mode that is implemented with stronger charge than the first charge mode, in response to the first moving object charge limit being equal to or smaller than the instantaneous power limit by absolute value, and wherein the first moving object charge limit is an estimated limit, to which the moving object is charged in the first charge mode, and is determined based on the predicted power demand and the second battery charge limit.

17. The method of claim 1, wherein the drive prediction model comprises a long short-term memory (LSTM) neural network cascaded with a deep neural network (DNN).

18. The device of claim 9, wherein the drive prediction model comprises a long short-term memory (LSTM) neural network cascaded with a deep neural network (DNN).

19. The device of claim 16, wherein the drive prediction model comprises a long short-term memory (LSTM) neural network cascaded with a deep neural network (DNN).

20. The device of claim 16, wherein the drive prediction model is trained using driving data that is split into training and test datasets, and wherein early stopping is applied during training to prevent overfitting by monitoring a loss function convergence.

* * * * *